United States Patent
Iwasawa

(10) Patent No.: US 9,329,370 B2
(45) Date of Patent: May 3, 2016

(54) ZOOM LENS, AND IMAGING APPARATUS EQUIPPED WITH SAME

(71) Applicant: TAMRON CO., LTD, Saitama-shi, Saitama (JP)

(72) Inventor: Yoshito Iwasawa, Tokyo (JP)

(73) Assignee: TAMRON CO., LTD., Saitama-shi, Saitama (JP)

(*) Notice: Subject to any disclaimer, the term of this patent is extended or adjusted under 35 U.S.C. 154(b) by 0 days.

(21) Appl. No.: 14/409,624

(22) PCT Filed: Jun. 24, 2013

(86) PCT No.: PCT/JP2013/067278
§ 371 (c)(1),
(2) Date: Dec. 19, 2014

(87) PCT Pub. No.: WO2013/191296
PCT Pub. Date: Dec. 27, 2013

(65) Prior Publication Data
US 2015/0177498 A1     Jun. 25, 2015

(30) Foreign Application Priority Data
Jun. 22, 2012    (JP) .................................. 2012-141272

(51) Int. Cl.
*G02B 15/14* (2006.01)
*G02B 15/16* (2006.01)
(Continued)

(52) U.S. Cl.
CPC .............. *G02B 15/16* (2013.01); *G02B 13/009* (2013.01); *G02B 13/0015* (2013.01); *G02B 15/177* (2013.01); *H04N 5/23296* (2013.01)

(58) Field of Classification Search
CPC ... G02B 13/0015; G02B 13/009; G02B 15/14
USPC .................................. 359/680–682, 676, 683
See application file for complete search history.

(56) References Cited

U.S. PATENT DOCUMENTS

| 5,847,882 A | 12/1998 | Nakayama |
| 6,094,312 A | 7/2000 | Nakayama |

(Continued)

FOREIGN PATENT DOCUMENTS

| JP | 3-6508 A | 1/1991 |
| JP | 8-146295 A | 6/1996 |

(Continued)

OTHER PUBLICATIONS

International Search Report dated Aug. 20, 2013, issued in corresponding application No. PCT/JP2013/067278.

*Primary Examiner* — Scott J Sugarman
(74) *Attorney, Agent, or Firm* — Westerman, Hattori, Daniels & Adrian, LLP

(57) ABSTRACT

A zoom lens exhibits a reduction in size, increased magnification, a reduction in variation of angle of view during zooming, and an increased focusing speed, said zoom lens being suitable for an imaging apparatus using a solid-state imaging device such as an interchangeable lens, a digital still camera, a digital video camera, or the like. The zoom lens has, in the lens system, at least: a first negative lens group having negative refractive power; a second negative lens group disposed further towards the image side than the first negative lens group, and which has negative refractive power; and a lens group (A) disposed so as to be adjacent to the image side of the second negative lens group. In the zoom lens, focusing from an infinite distance to a near object is performed by moving only the second negative lens group towards the image side, and prescribed conditions are satisfied.

15 Claims, 16 Drawing Sheets

(51) Int. Cl.
*G02B 15/177* (2006.01)
*G02B 13/00* (2006.01)
*H04N 5/232* (2006.01)

(56) References Cited

U.S. PATENT DOCUMENTS

| | | | |
|---|---|---|---|
| 6,236,516 | B1 | 5/2001 | Misaka |
| 6,392,816 | B1 | 5/2002 | Hamano |
| 2007/0217026 | A1 | 9/2007 | Nishimura |
| 2008/0218875 | A1 | 9/2008 | Kuroda et al. |
| 2012/0019929 | A1* | 1/2012 | Fujisaki ............... G02B 15/161 359/683 |

FOREIGN PATENT DOCUMENTS

| | | |
|---|---|---|
| JP | 8-190051 A | 7/1996 |
| JP | 2000-28923 A | 1/2000 |
| JP | 2001-356270 A | 12/2001 |
| JP | 2006-251462 A | 9/2006 |
| JP | 2007-248952 A | 9/2007 |

* cited by examiner

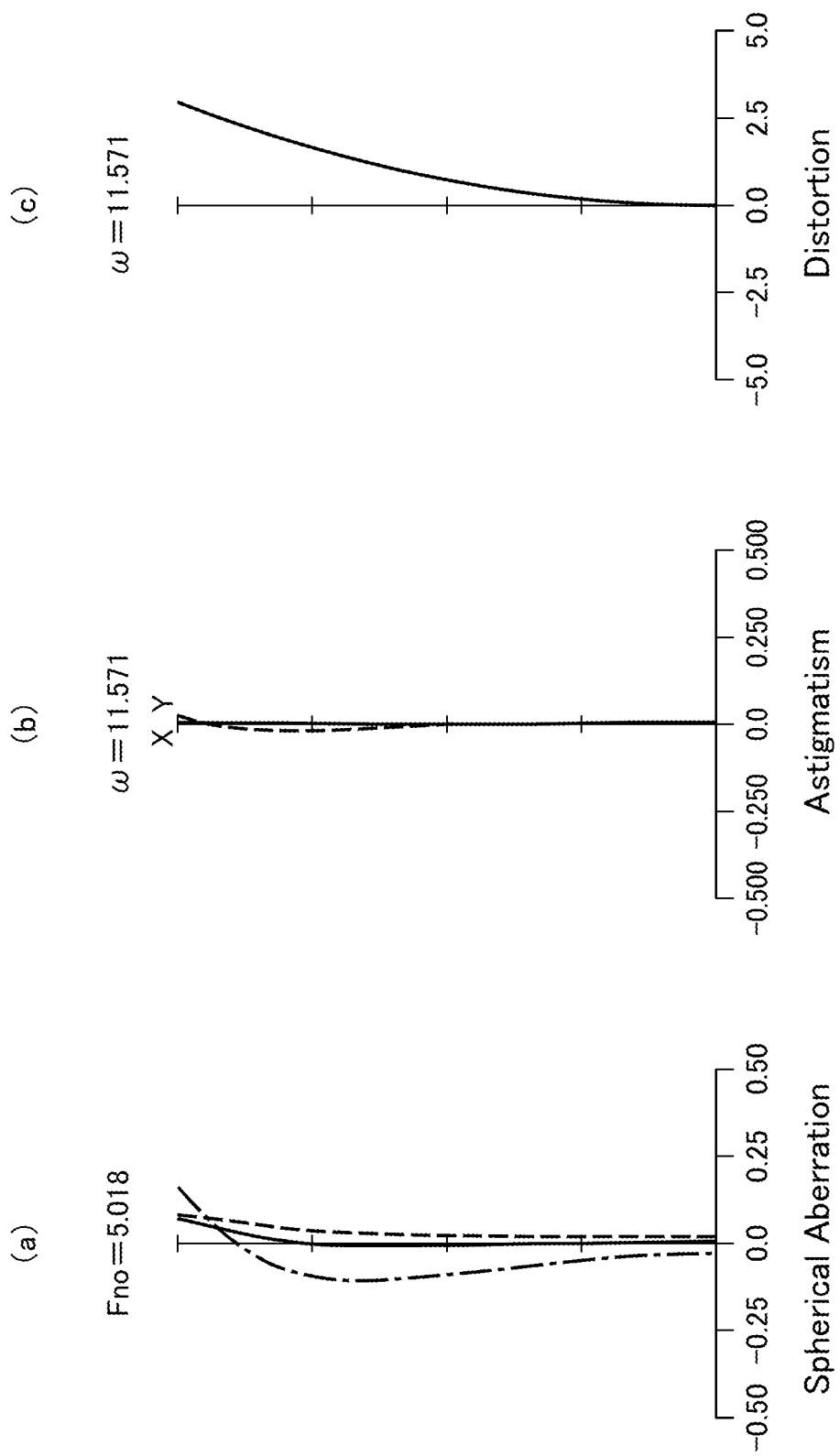

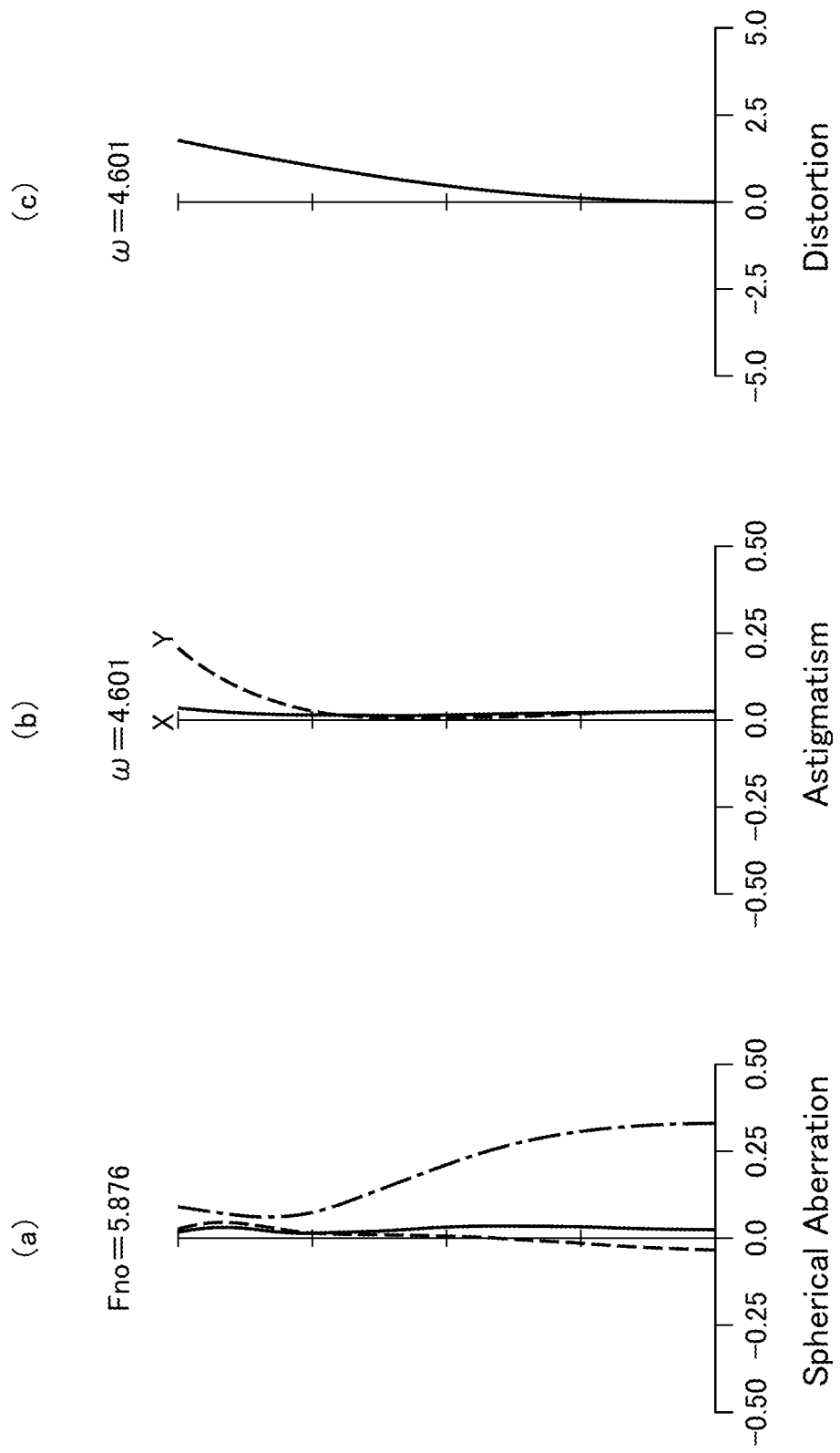

ZOOM LENS, AND IMAGING APPARATUS EQUIPPED WITH SAME

FIELD OF THE INVENTION

The present invention relates to zoom lenses and camera devices incorporating the same, and more particularly, compact, light-weight, and high-speed focusing zoom lenses and camera devices incorporating the same.

BACKGROUND ART

As imaging optical systems dedicated to digital input/output apparatuses such as digital still cameras, digital video cameras, and the like, compact and light-weight zoom lenses capable of focusing on an object within close-up photographing range have been desired, and moreover, also desired have been camera devices incorporating zoom lenses capable of high-speed focusing on an object within close-up photographing range.

For the recent years, camera devices, such as digital still cameras, employing solid state image sensors have become increasingly popular. Especially, exchangeable lens systems in single-lens reflex style have been popular so far, which exploit phase difference sensors and distance data output therefrom, for the focusing. For the more recent years, however, new generations of the exchangeable lens systems have rapidly come into wide use, which make image pick-up devices determine contrast of an image and thus obtain focusing data on the contrast of the image for optimizing the focusing.

In such imaging optical systems that conduct the focusing on the data of the contrast of the image detected by image pick-up devices incorporated in compact digital still cameras and new generations of the exchangeable lens systems, generally, the peak of the contrast of the image formed by the optics is determined while lens groups dedicated to the focusing are being displaced. To that end, the focusing lens groups have to once reach their respective positions to attain the highest or peak contrast and further pass over to detect those positions related to the peak contrast. Thus, the focusing lens groups need to respectively recede to the positions again for the peak contrast.

Such displacement of the focusing lens groups is sort of reciprocation along the optical axis, namely, oscillation in such directions. Thus, in order to attain high-speed auto-focusing, the focusing lens groups have to be displaced at high speed.

Meanwhile, when the displacement along the optical axis of the focusing lens groups causes a field angle to vary, and then an imaging magnification to vary, beams in the course of being focused creates a shaking picture, and such picture disturbance leads to deterioration of image quality and makes a photographer feel unpleasant.

In the prior art, a typical architecture of high variable power zoom lenses is that which has first and second lens groups in a series, namely, a positive power lens group disposed the closest to an object to photograph and a negative power lens group closer to the image plane. Any of this type of lens systems has its first lens group disposed the foremost and dimensioned the greatest in diameter, and by virtue of an ability of the first lens group to condense rays, the succeeding lens group closer to the image plane may be relatively small in diameter. Such lens system highly owes the variable power to the second lens group, and therefore, the second lens group has to have strengthened refractive power. For that purpose, correction of aberrations are controlled by so greater a number of lens pieces, which is prone to increase in the weight of the lens system as a whole.

To cope with this in the prior art, that is, to reduce the weight of the focusing lens groups as much as possible, optical systems employing the so-called inner focusing have been proposed, which avoid using the foremost large lens for the focusing and instead have the succeeding lens group(s) used to adjust a flux of the rays already condensed for creating a clear image.

Such inner focusing type optical systems include that which has its fourth lens group of negative refractive power dedicated to the focusing, which, specifically, is a zoom lens that comprises a first lens group of positive refractive power positioned the closest to one of the conjugate points from which the point of the minimally condensed light flux or the aperture stop is positioned more apart, a lens group of negative refractive power positioned the second closest, and one or more succeeding lens groups of positive refractive power, as a whole, positioned closer to the other conjugate point to which the point of the minimally condensed light flux or the aperture stop is closer where when the zoom lens has its focusing posture varied from the wide-angle end to the telephoto end to vary magnification, a distance between the first and second lens groups becomes greater while a distance between the second lens group and the one or more succeeding lens groups is smaller. The second lens group is comprised of a negative power subset 2a and another negative power subset 2b closer than the subset 2a to the other conjugate point closer to the aperture stop and dedicated to the focusing. The zoom lens meets the requirements defined in the formula as follows:

$$0.3 < |f2a|/(fw \times ft)^{1/2} < 0.9$$

where fw is a focal length of the zoom lens focusing wide-angle, ft is a focal length of the zoom lens focusing telephoto, and f2a is a focal length of the subset 2a. (See, for instance, Patent Document 1 listed below.)

Some other inner focusing type optical systems include a zoom lens system that comprises a first positive power lens group, a second negative power lens group, a third positive power lens group, a fourth negative power lens group, a fifth positive power lens group, and a sixth negative power lens group serially arranged in order on the closest to an object first basis where the zoom lens varies magnification by altering distances between adjacent pairs of its lens groups, meeting the requirements defined in the formulae as follows:

$$DW(1-2) < DT(1-2) \tag{1}$$

$$DW(2-3) < DT(2-3) \tag{2}$$

$$DW(3-4) < DT(3-4) \tag{3}$$

$$DW(4-5) < DT(4-5) \tag{4}$$

$$DW(5-6) < DT(5-6) \tag{5}$$

where DW(i–j) is a distance between the i-th and j-th lens groups of the zoom lens system focusing wide-angle in infinity focus, and DT(i–j) is a distance between the i-th and j-th lens groups of the zoom lens focusing telephoto in infinity focus. The fourth lens group is displaced along the optical axis for the focusing. (See, for instance, Patent Document 2 listed below.)

LIST OF THE DOCUMENTS OF THE RELATED ART

Patent Documents 1 and 2

1. JPN Preliminary Publication of Unexamined Pat. Appl. No. 2000-28923
2. JPN Preliminary Publication of Unexamined Pat. Appl. No. 2006-251462

SUMMARY OF THE INVENTION

Problem to be Solved by the Invention

The zoom lenses disclosed in Patent Document 1 and Document 2 are of inner focusing type, and such zoom lenses have their focusing lenses satisfactorily reduced in weight but still fail to reduce a varied angle of field sufficiently during the focusing.

Object of the Invention

The present invention is made to give a solution to the aforementioned problem, and accordingly, it is an object of the present invention to provide a zoom lens design suitable for camera devices, such as exchangeable lenses, digital still cameras, digital video cameras, and the like, incorporating solid-state image sensors therein that facilitates downsizing the resultant zoom lens, enhancing magnification, suppressing alteration in the angle of field during the focusing, and attaining high-speed focusing.

Solutions to the Problem with the Prior Art

<1st Aspect of the Invention>

In accordance with a first aspect of the present invention, provided is a zoom lens of which lens optics comprises at least a first negative lens group of minus refractive power, a second negative lens group of minus refractive power positioned closer to the image plane, and another lens group A positioned immediately behind the second negative lens group and closer to the image plane, the second negative lens group alone being displaced toward the image plane for shifting the focus from an infinity point to an object within close-up photographing range, the zoom lens meeting the requirements defined in the formula as follows:

$$1.0 < \beta 32n\max/\beta 2n\min < 1.4 \qquad (1)$$

$$(1-\beta 2nt^2) \times \beta rt^2 < -6.0 \qquad (2)$$

where $\beta 2n\max$ is the maximum value of lateral magnification of the second negative lens group during the zooming, $\beta 2n\min$ is the minimum value of lateral magnification of the second negative lens group during the zooming, $\beta 2nt$ is a lateral magnification of the second negative lens group when the zoom lens is focusing telephoto, and $\beta rt$ is a composite lateral magnification of lens groups positioned closer to the image plane than the second negative lens group when the zoom lens is focusing telephoto.

The zoom lens in the first aspect of the present invention reduces alteration in the lateral magnification of the focusing lens group during the zooming for minimizing variable power of the focusing lens group and optimizes the lateral magnification of the focusing lens group and the composite lateral magnification of the lens groups closer to the image plane than the focusing lens group for enhancing focusing sensitivity of the lens optics.

The expression 'variable power' of the focusing lens group refers to alteration in the angle of field while the focusing lens group is being displaced.

The expression 'focusing sensitivity' refers to an extent of a displacement of the focusing lens group relative to a displacement of the image plane. Thus, the lens optics increased in focusing sensitivity is able to reduce the displacement of the focusing lens group during the focusing.

In a typical high variable power zoom lens, usually, a positive power lens group is positioned the closest to an object to photograph as the foremost or first lens group and is followed by a negative power lens group as the second lens group closer to the image plane. In such lens optics thus designed, the second lens group is the primary element of governing the variable power, and hence, assigning the second lens group for the focusing makes it difficult to reduce the variable power during the focusing as desired.

Also, the second lens group must be of high refractive power to attain so great variable power as desired, and, to that end, must have an increased number of lens pieces for compensation for aberrations and unavoidably encounters an increase in weight, which is disadvantageous in view of weight reduction.

In these circumstances, the present invention provides a deliberate solution in which a first negative lens group of minus refractive power positioned the closest in the lens optics to an object to photograph is assigned for power varying and is followed by a second negative lens group positioned closer to the image plane and having its variable power reduced, so as to bring about an effect of reducing alteration in the angle of view during the focusing, namely, of reducing the variable power during the focusing.

<2nd Aspect of the Invention>

In accordance with a second aspect of the present invention, provided is a zoom lens of which lens optics comprises at least a first negative lens group of minus refractive power, another or second negative lens group of minus refractive power positioned closer to the image plane, and an additional lens group A positioned immediately behind the second negative lens group and closer to the image plane, the second negative lens group alone being displaced toward the image plane for shifting the focus from an infinity point to an object within close-up photographing range, the zoom lens meeting the requirements defined in the formula as follows:

$$1.0 < \beta 2n\max/\beta 2n\min < 1.4 \qquad (1)$$

$$1.05 < \beta 3t/\beta 3w < 2.00 \qquad (3)$$

where $\beta 2n\max$ is the maximum value of lateral magnification of the second negative lens group during the zooming, $\beta 2n\min$ is the minimum value of lateral magnification of the second negative lens group during the zooming, $\beta 3t$ is a lateral magnification of the lens group A when the zoom lens is focusing telephoto, and $\beta 3w$ is a lateral magnification of the lens group A when the zoom lens is focusing wide angle.

The zoom lens in the second aspect of the present invention has an effect of assigning the lens group A to govern the variable power and instead allotting the variable power governing task the second negative lens group should dedicated itself to, for facilitating compensation for aberrations by the second negative lens group and reducing alteration in the angle of field during the focusing, namely, reducing the variable power during the focusing, as well as the aforementioned effect the present invention in the first aspect brings about.

<3rd Aspect of the Invention>

A third aspect of the present invention provides a camera device that comprises any of the zoom lenses in the first and second aspects of the present invention and image pick-up sensors positioned behind the zoom lens and close to the image plane for converting an image optically produced by the zoom lens into electric signals.

The third aspect of the present invention exploits the aforementioned features of any of the zoom lenses in the first and second aspects of the present invention and provides solutions of a compact, light-weight and high-speed focusing zoom lens and a camera device incorporating the same.

Embodiment 1 of the Invention

In the first aspect of the present invention, the zoom lens is characterized in that the lens group A meets the requirements defined in the formula as follows:

$$1.05 < \beta 3t/\beta 3w < 2.00 \quad (3)$$

where β3t is a lateral magnification of the lens group A when the zoom lens is focusing telephoto, and β3w is a lateral magnification of the lens group A when the zoom lens is focusing wide angle.

Embodiment 2 of the Invention

In any of the first and second aspects of the present invention, the zoom lens has its first negative lens group designed as defined in any of Claims 1 to 3 in the appended claims.

$$3.5 < \beta 1nt/\beta 1nw < 8 \quad (4)$$

where β1nt is a lateral magnification of the first negative lens group when the zoom lens is focusing telephoto, and β1nw is a lateral magnification of the first negative lens group when the zoom lens is focusing wide angle.

Embodiment 3 of the Invention

In any of the first and second aspects of the present invention, the zoom lens is characterized in that a first positive lens group of plus refractive power is disposed before the first negative lens group and closer to the object to photograph.

Embodiment 4 of the Invention

In the third embodiment of the present invention, the zoom lens is characterized in that there are disposed a series of lens groups arranged in order on the closest to an object first basis, including the first positive lens group, the first negative lens group, another or second positive lens group of plus refractive power, the second negative lens group, and the lens group A.

Embodiment 5 in the Invention

In any of the first and second aspects of the present invention, the zoom lens is characterized in that the lens group A exhibits minus refractive power.

Embodiment 6 of the Invention

In any of the first and second aspects of the invention, the zoom lens is characterized in that the lens groups behind the second negative lens group and closer to the image plane meet the requirements defined in the formula as follows:

$$-1.0 < frt/ft < -0.15 \quad (5)$$

where frt is a composite focal length of the lens groups behind the second negative lens group and closer to the image plane, and ft is a focal length of the zoom lens focusing telephoto.

The formula (1) is a conditional expression that defines an extent of the variable power of the second negative lens group serving as a focusing lens group.

$$1.0 < \beta 2nmax/\beta 2nmin < 1.4 \quad (1)$$

where β2nmax is the maximum value of lateral magnification of the second negative lens group during the zooming, and β2nmin is the minimum value of lateral magnification of the second negative lens group during the zooming.

A lens design satisfying the requirements defined in the formula (1) is intended to reduce the variable power of the focusing lens group, and the resultant lens optics has its variable power reduced during the focusing.

The formula (2) is a conditional expression that defines the focusing sensitivity of the second negative lens group serving as a focusing lens group.

$$(1-\beta 2nt^2) \times \beta rt^2 < -6.0 \quad (2)$$

where β2nt is a lateral magnification of the second negative lens group when the zoom lens is focusing telephoto, and βrt is a lateral magnification of the lens group A behind the second negative lens group and closer to the image plane when the zoom lens is focusing telephoto.

A lens design satisfying the requirements defined in the formula (2) is intended to enhance the focusing sensitivity of the focusing lens group, and in other words, it can reduce a displacement of the focusing lens group during the focusing. This is effective in downsizing the zoom lens and attaining high-speed auto focusing.

The formula (3) is a conditional expression that defines a power varying ratio of the lens group A.

$$1.05 < \beta 3t/\beta 3w < 2.00 \quad (3)$$

where β3t is a lateral magnification of the lens group A when the zoom lens is focusing telephoto, and β3w is a lateral magnification of the lens group A when the zoom lens is focusing wide angle.

Appropriately prescribing the power varying ratio sufficiently large as falling within the range defined in the formula for the lens group immediately behind the second negative lens group (focusing lens group) and closer to the image plane, the second negative lens group (focusing lens group) can have its variable power reduced.

The formula (4) is a conditional expression that defines a power varying ratio of the first negative lens group.

$$3.5 < \beta 1nt/\beta 1nw < 8 \quad (4)$$

where β1nt is a lateral magnification of the first negative lens group when the zoom lens is focusing telephoto, and β1nw is a lateral magnification of the first negative lens group when the zoom lens is focusing wide angle.

A zoom lens design optimizing the power varying ratio of the first negative lens group permits the resultant zoom lens to attain enhanced magnification and downsizing at the same time as desired.

When the ratio is smaller than the lower limit defined in the formula (4), namely, when the power varying ratio of the first negative lens group is considerably small, it is hard to have the lens optics with sufficiently enhanced magnification. When the ratio exceeds the upper limit defined in the formula (4), namely, when the power varying ratio of the first negative lens group is excessively large, so greater a number of the lens pieces are necessary to compensate for aberrations, which makes the zoom lens design fail to downsize.

The formula (5) is a conditional expression that defines a composite focal length of the lens groups behind the second negative lens group and closer to the image plane during focusing telephoto.

$$-1.0 < frt/ft < -0.15 \quad (5)$$

where frt is a composite focal length of the lens groups behind the second negative lens group and closer to the image plane during focusing telephoto, ft is a focal length of the zoom lens focusing telephoto.

Appropriately prescribing a composite focal length of the lens groups behind the second negative lens group and closer to the image plane during focusing telephoto permits the zoom lens to have a reduced telephoto ratio and thus to reduce the whole longitudinal dimension during focusing telephoto.

When frt/ft is smaller than the lower limit defined in the formula (5), namely, when the composite focal length of the lens groups behind the second negative lens group and closer to the image plane is excessively great, the resultant zoom lens comes to have an increased telephoto ratio and thus fails to reduce the whole longitudinal dimension during focusing telephoto. When frt/ft exceeds the upper limit defined in the formula (5), namely, when the composite focal length of the lens groups behind the second negative lens group and closer to the image plane becomes excessively small, the resultant zoom lens comes to have a telephoto ratio excessively reduced and thus encounters difficulties in attaining a zoom lens design with a reduced number of the lens pieces, which makes the zoom lens design fail to downsize.

BRIEF DESCRIPTION OF THE DRAWINGS

FIG. 15 depicts graphs of spherical aberration, astigmatism, and distortion developed in the fourth embodiment of the zoom lens in the intermediate focal distance and in infinity focus; and FIG. 16 depicts graphs of spherical aberration, astigmatism, and distortion developed in the fourth embodiment of the zoom lens photographing at the telephoto end and in infinity focus.

BEST MODE OF THE INVENTION

Figure 1:
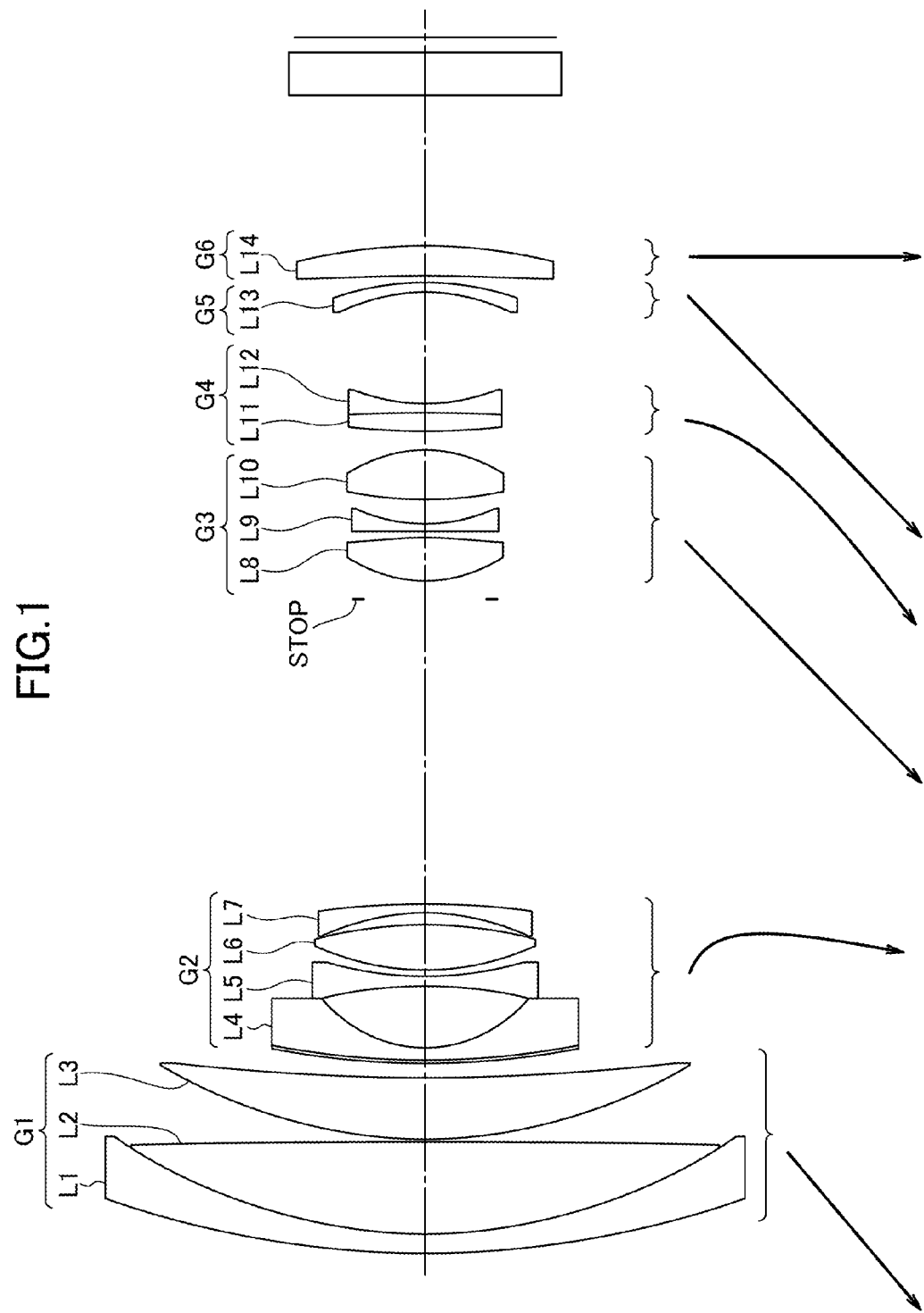
FIG. 1 is a vertical cross sectional view illustrating lens optics in a first embodiment of a zoom lens according to the present invention, with the zoom lens taking an operative posture at the wide-angle end.
Figure 2:
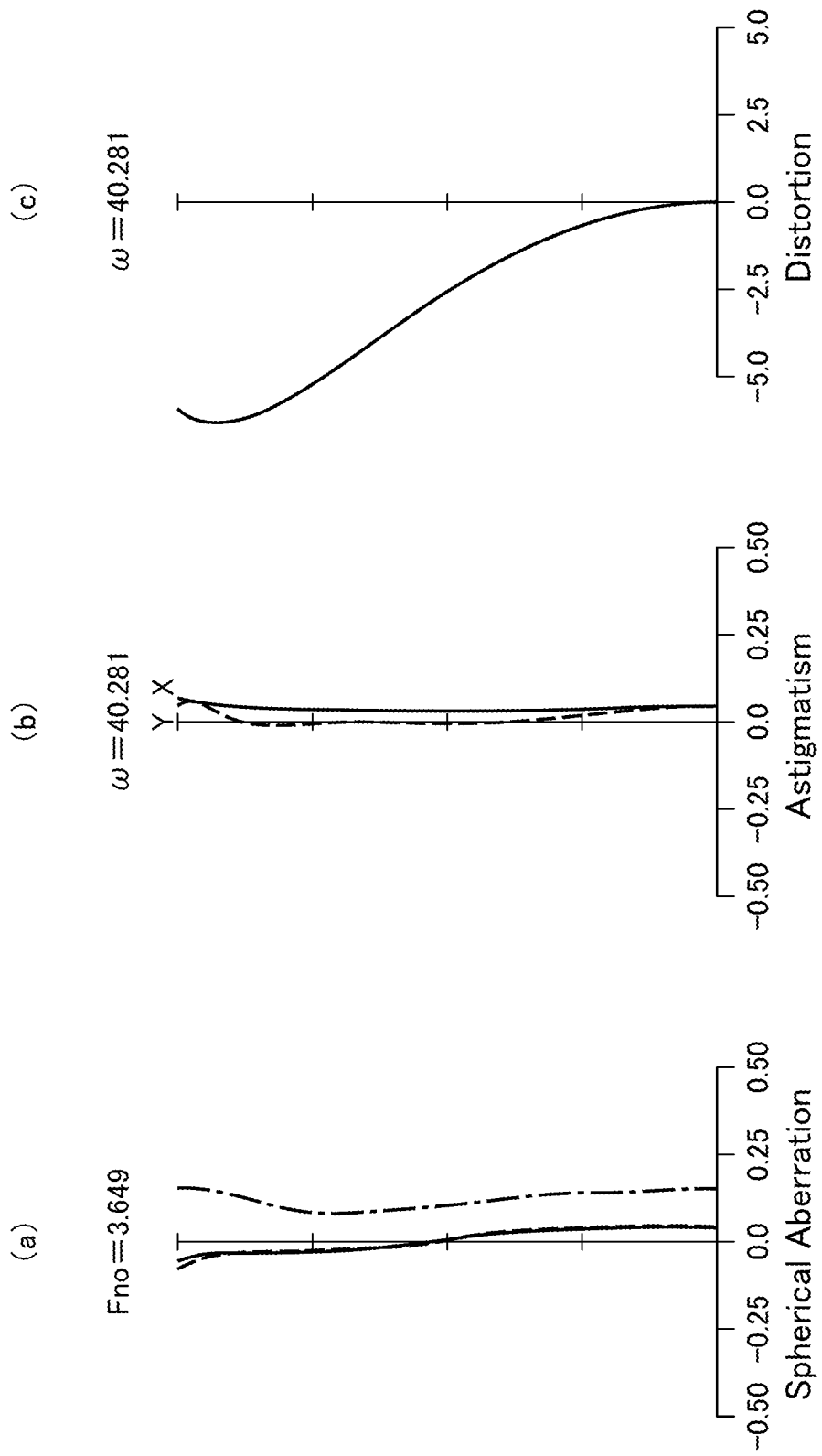
FIG. 2 depicts graphs of spherical aberration, astigmatism, and distortion developed in the first embodiment of the zoom lens photographing at the wide-angle end and in infinity focus.
Figure 3:
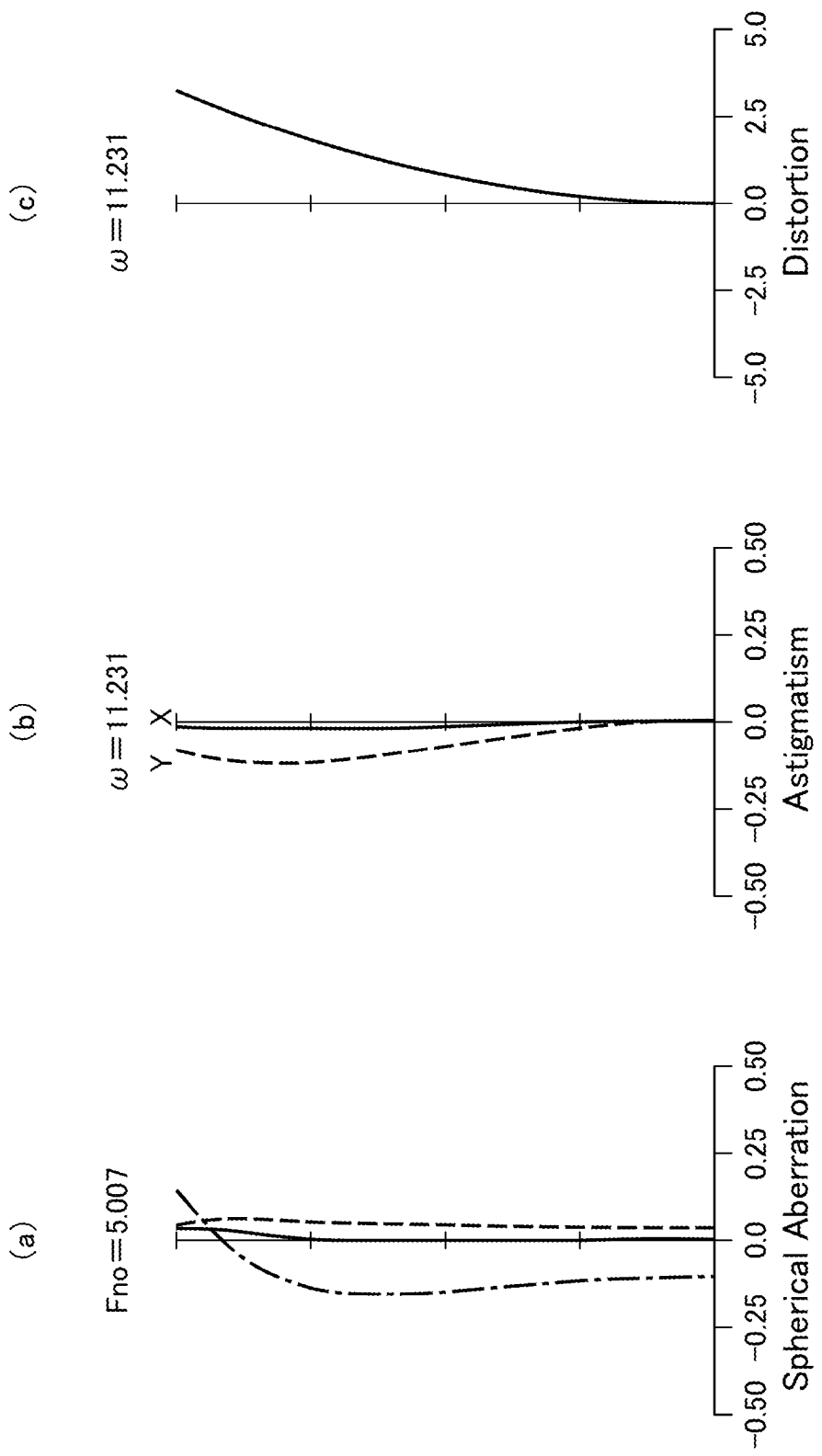
FIG. 3 depicts graphs of spherical aberration, astigmatism, and distortion developed in the first embodiment of the zoom lens in the intermediate focal distance and in infinity focus.
Figure 4:
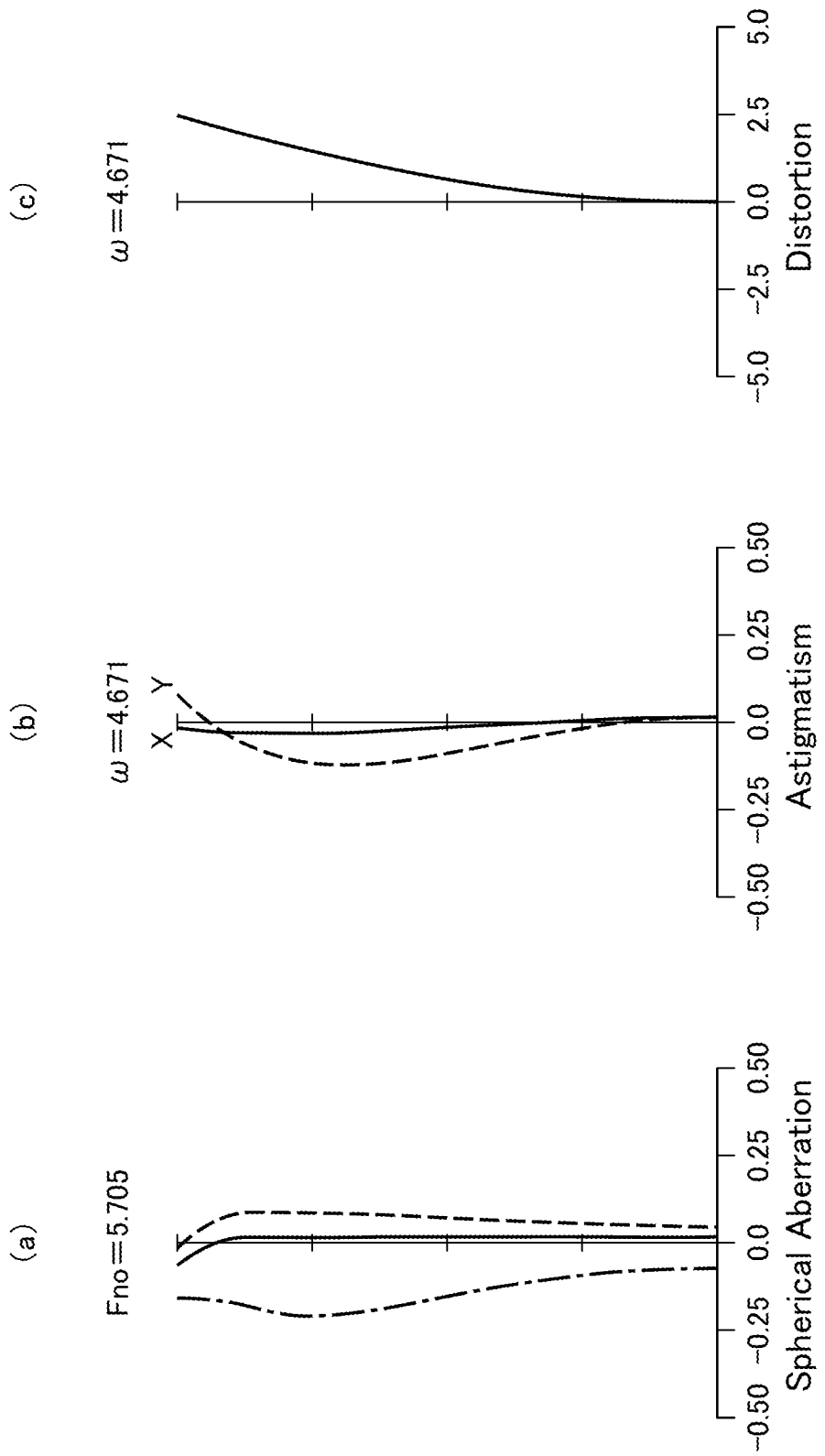
FIG. 4 depicts graphs of spherical aberration, astigmatism, and distortion developed in the first embodiment of the zoom lens photographing at the telephoto end and in infinity focus.
Figure 5:
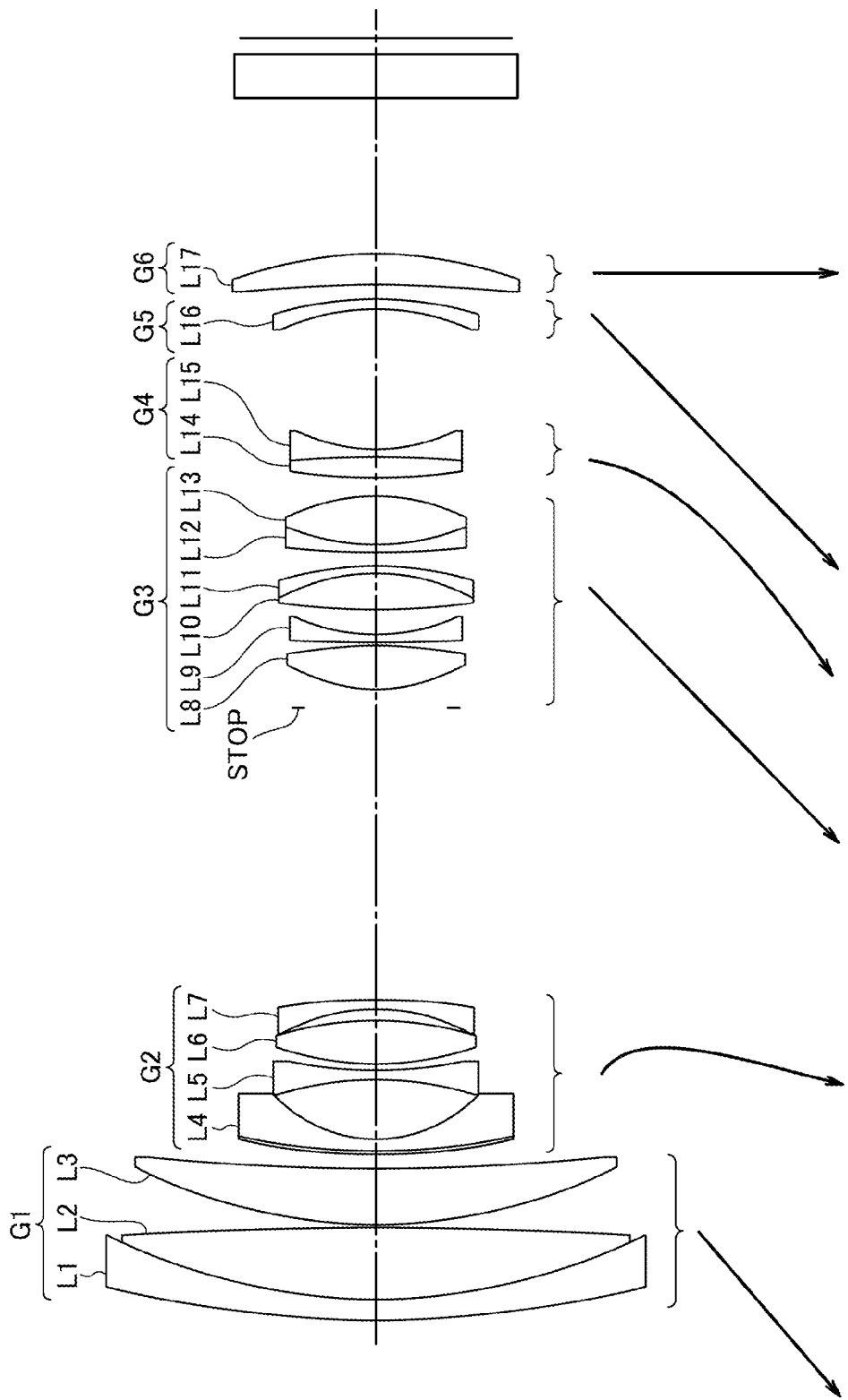
FIG. 5 is a vertical cross sectional view illustrating lens optics in a second embodiment of a zoom lens according to the present invention, with the zoom lens taking an operative posture at the wide-angle end.
Figure 6:
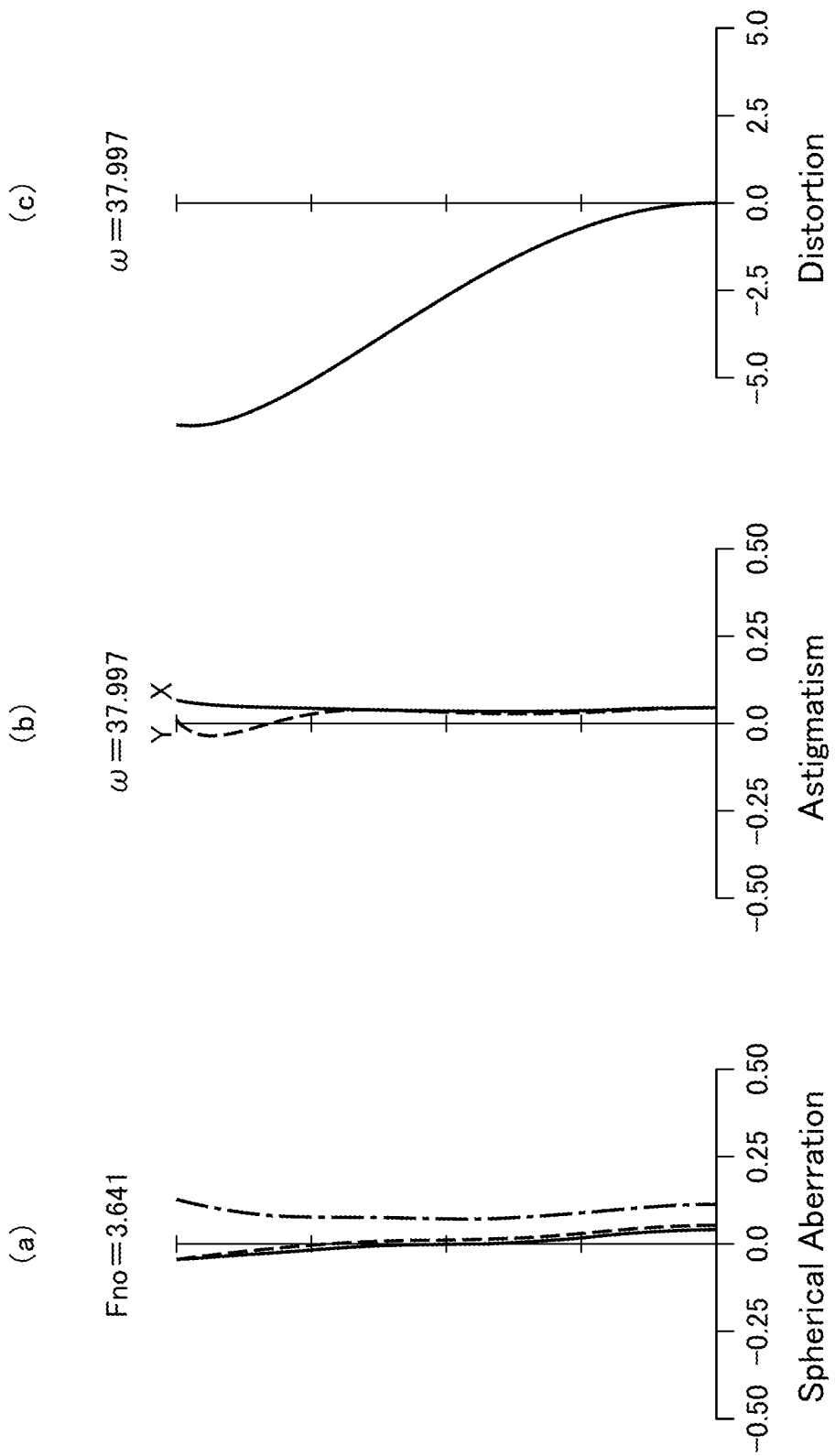
FIG. 6 depicts graphs of spherical aberration, astigmatism, and distortion developed in the second embodiment of the zoom lens photographing at the wide-angle end and in infinity focus.
Figure 7:
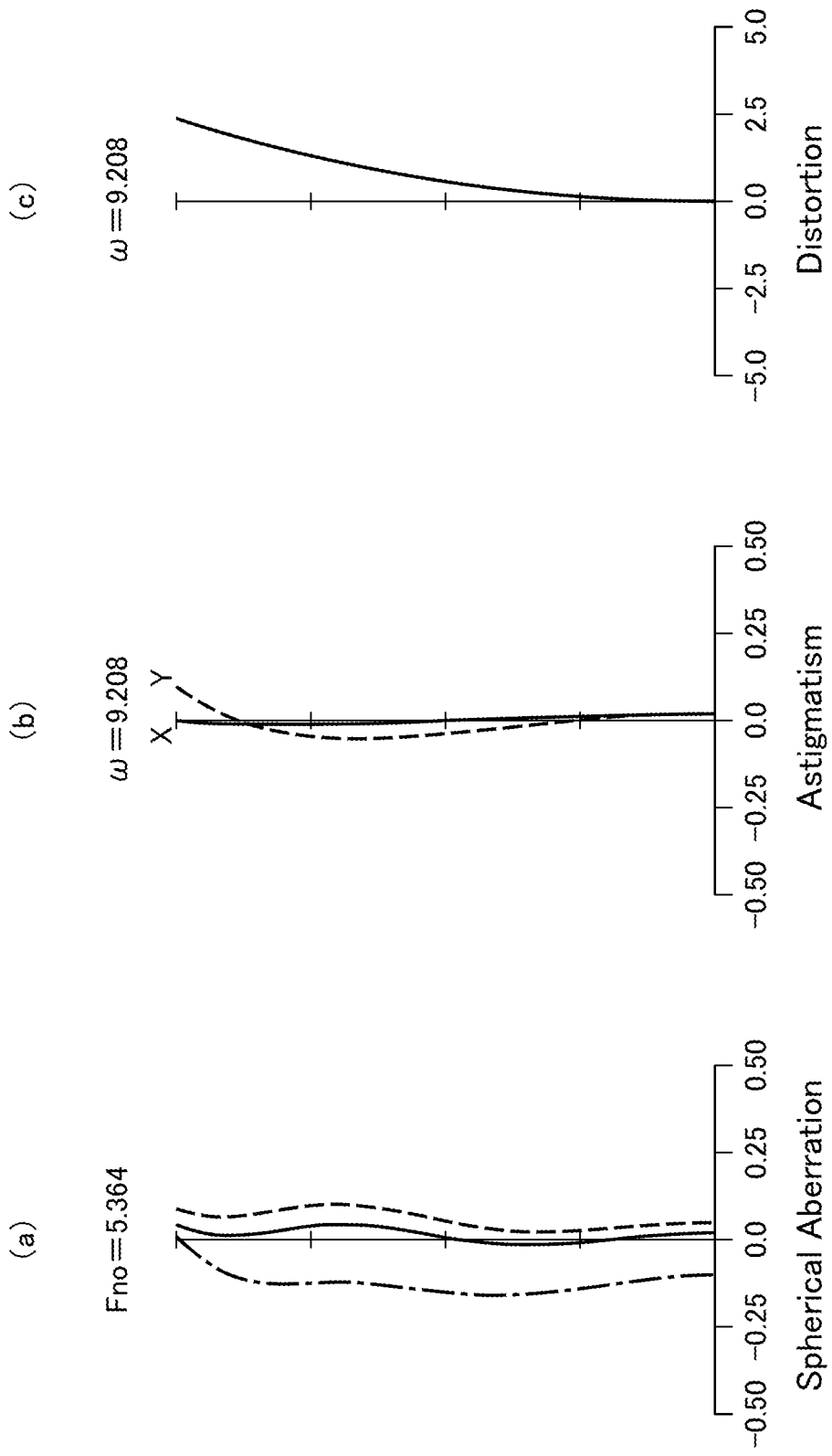
FIG. 7 depicts graphs of spherical aberration, astigmatism, and distortion developed in the second embodiment of the zoom lens in the intermediate focal distance and in infinity focus.
Figure 8:
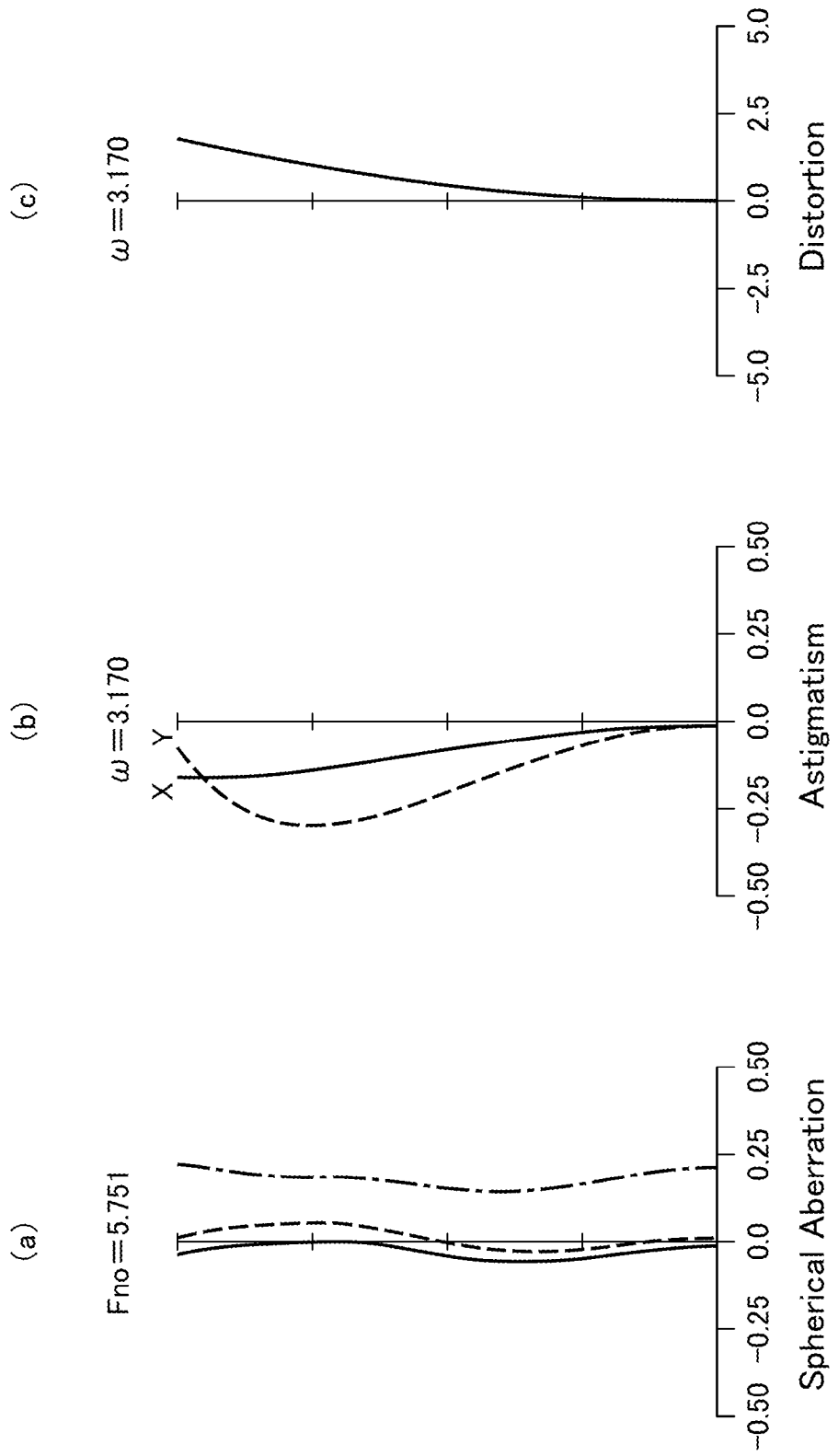
FIG. 8 depicts graphs of spherical aberration, astigmatism, and distortion developed in the second embodiment of the zoom lens photographing at the telephoto end and in infinity focus.
Figure 9:
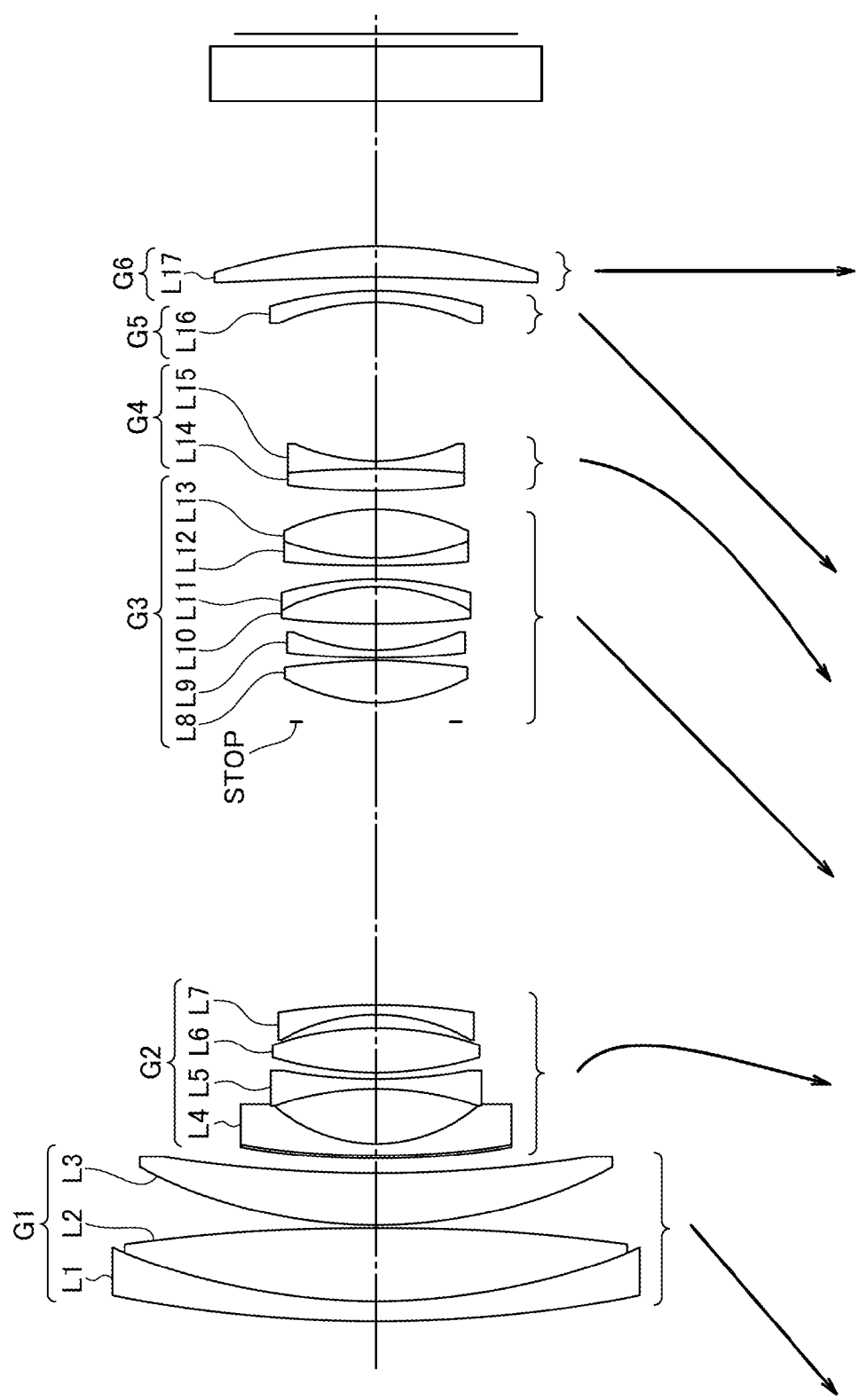
FIG. 9 is a vertical cross sectional view illustrating lens optics in a third embodiment of a zoom lens according to the present invention, with the zoom lens taking an operative posture at the wide-angle end.
Figure 10:
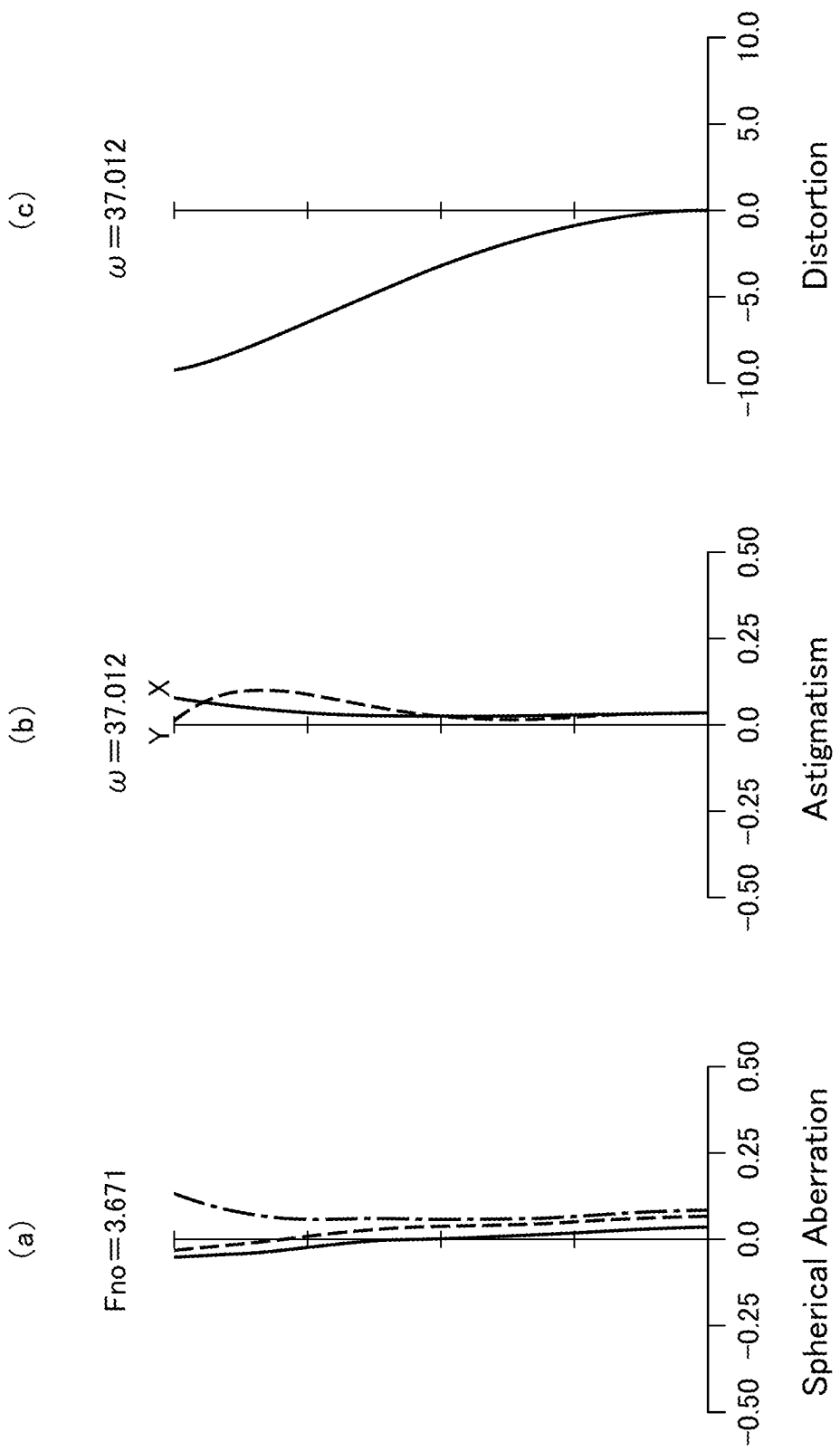
FIG. 10 depicts graphs of spherical aberration, astigmatism, and distortion developed in the third embodiment of the zoom lens photographing at the wide-angle end and in infinity focus.
Figure 11:
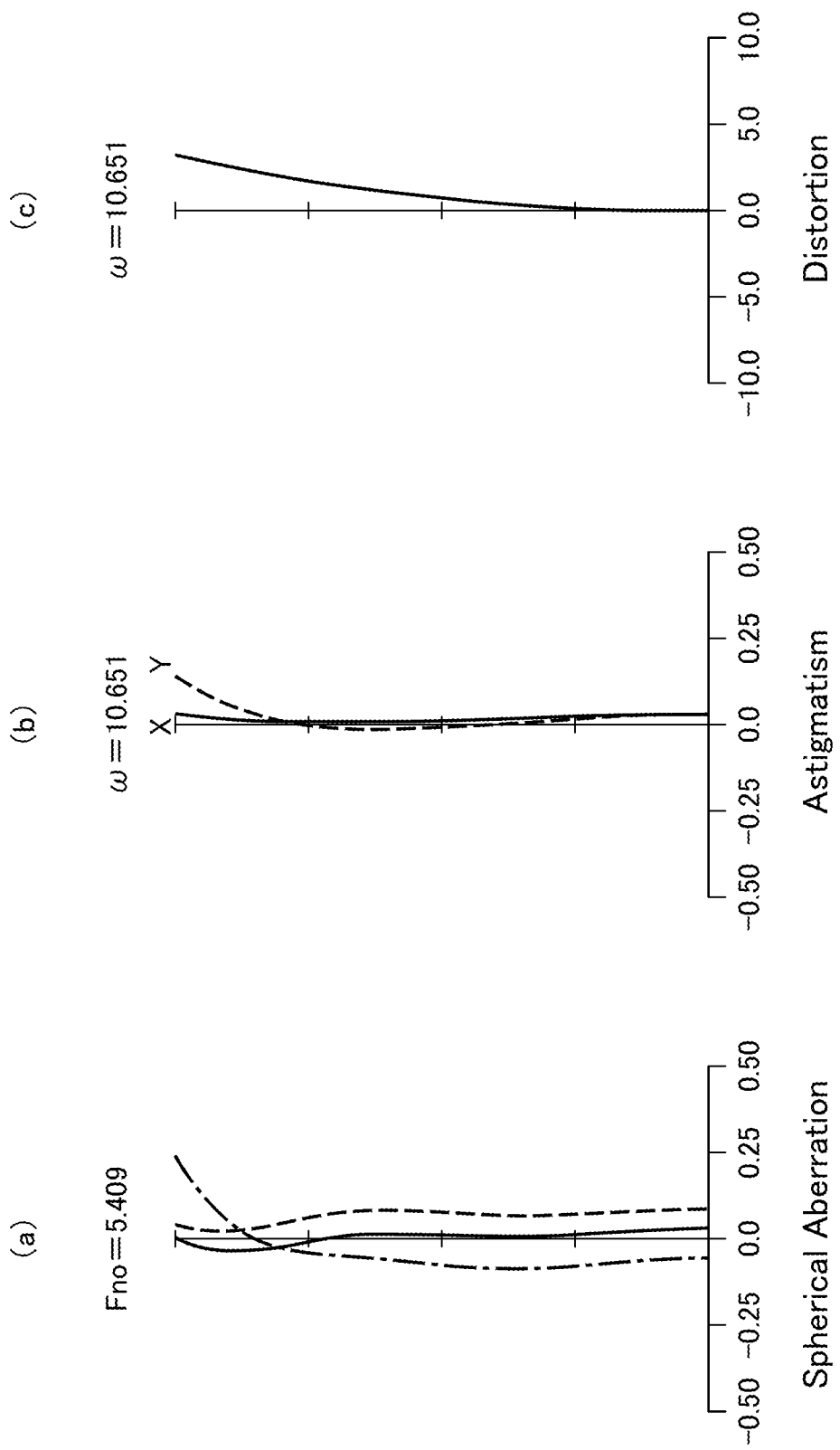
FIG. 11 depicts graphs of spherical aberration, astigmatism, and distortion developed in the third embodiment of the zoom lens in the intermediate focal distance and in infinity focus.
Figure 12:
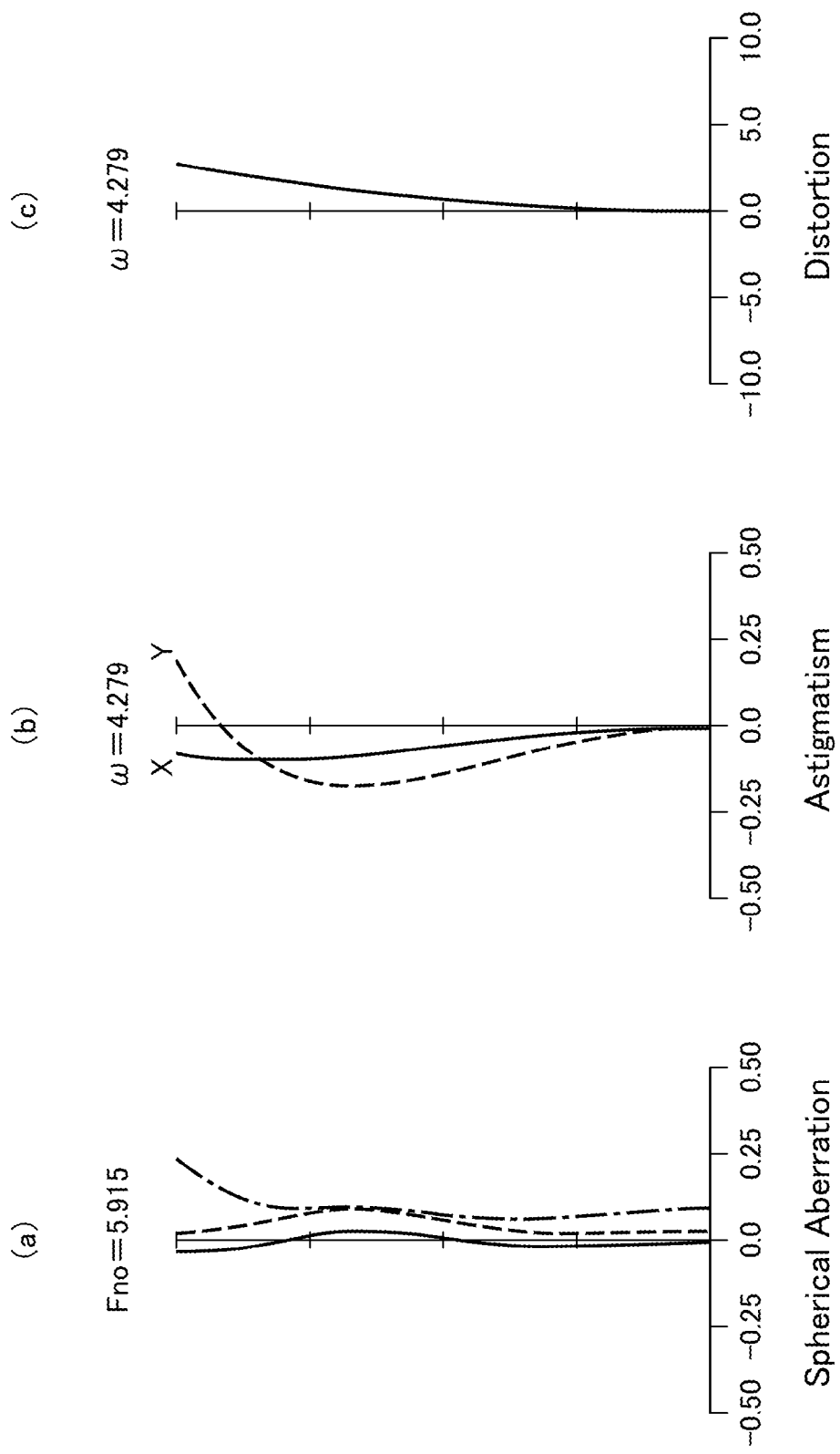
FIG. 12 depicts graphs of spherical aberration, astigmatism, and distortion developed in the third embodiment of the zoom lens photographing at the telephoto end and in infinity focus.
Figure 13:
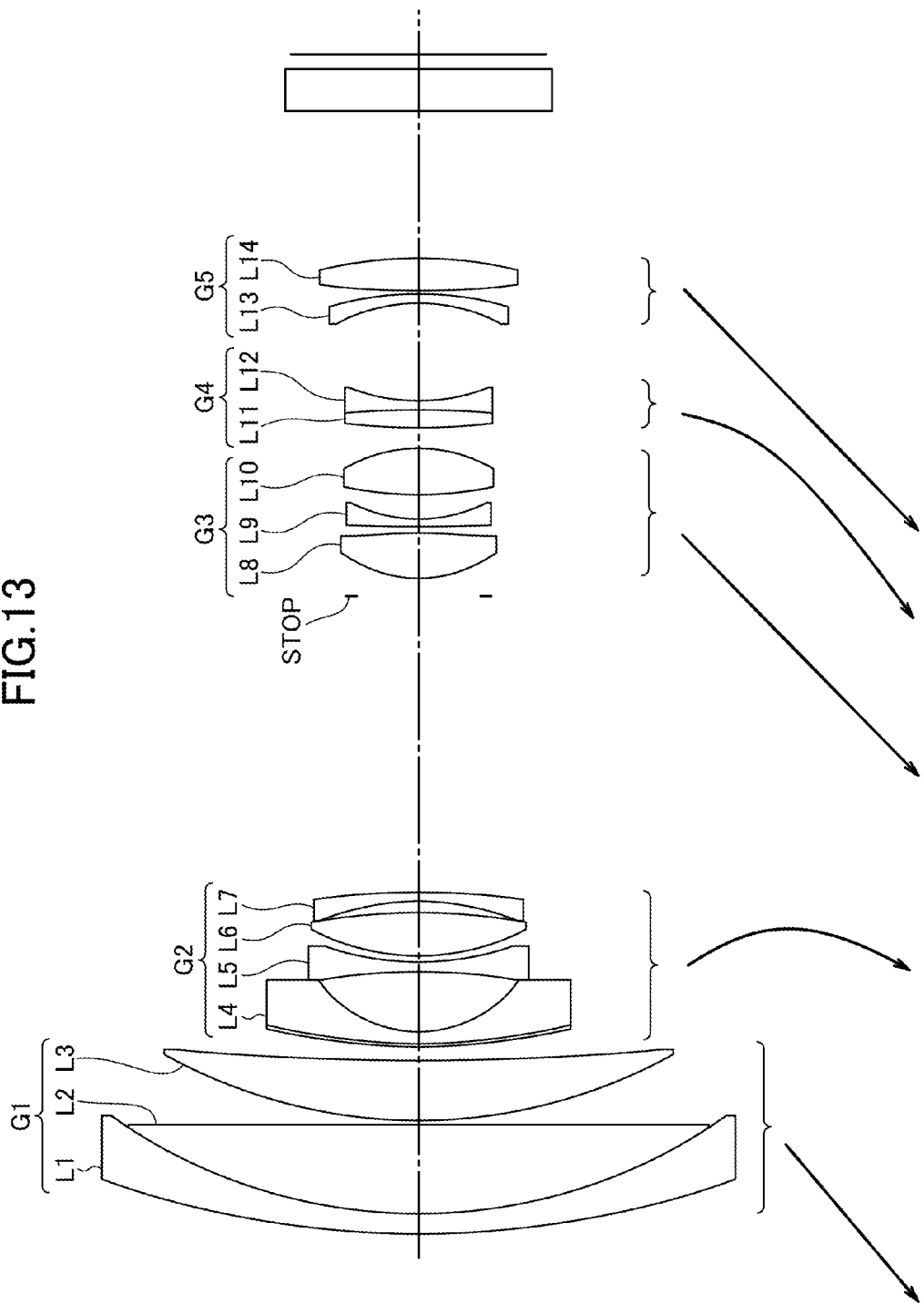
FIG. 13 is a vertical cross sectional view illustrating lens optics in a fourth embodiment of a zoom lens according to the present invention, with the zoom lens taking an operative posture at the wide-angle end.
Figure 14:
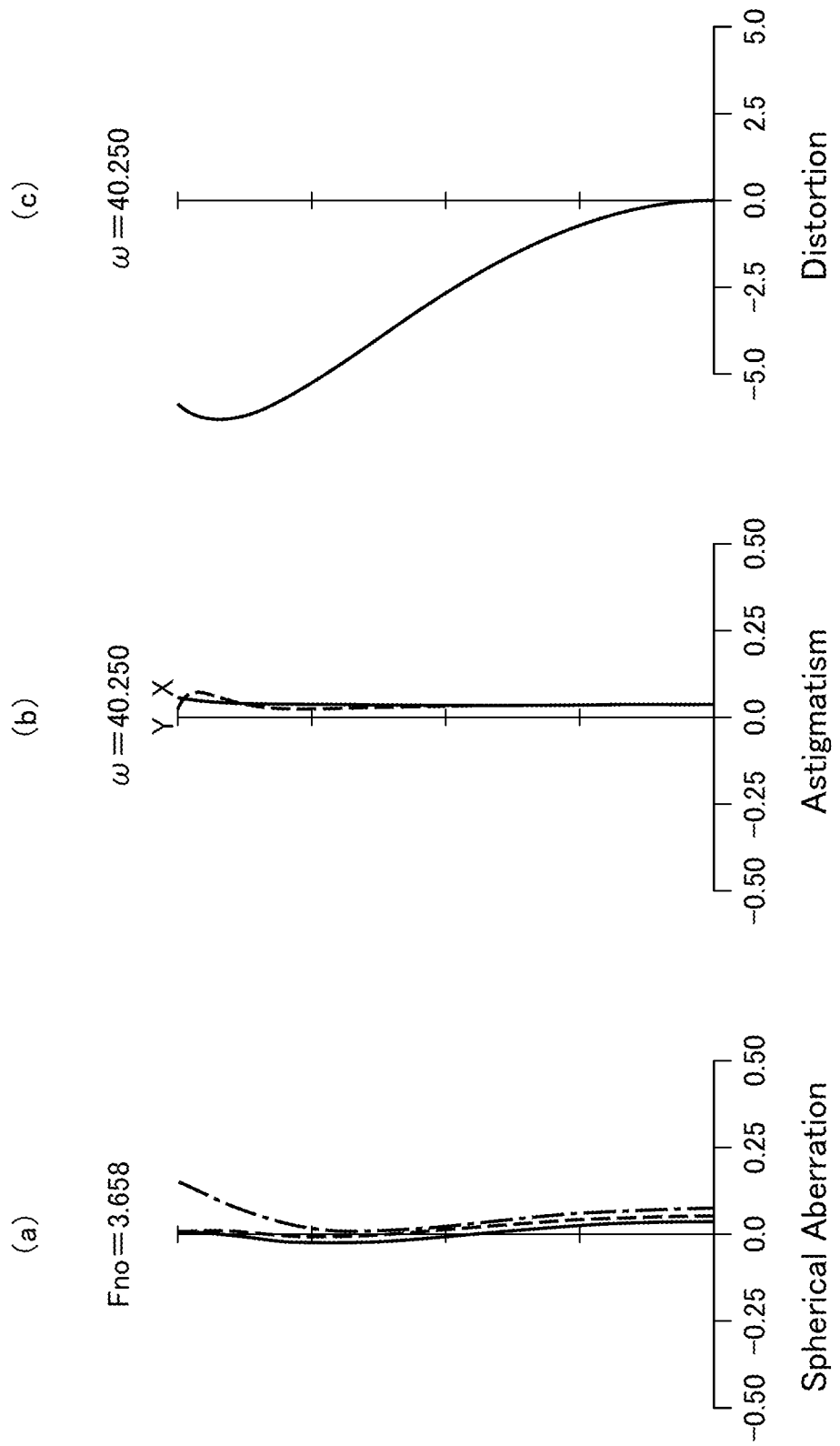
FIG. 14 depicts graphs of spherical aberration, astigmatism, and distortion developed in the fourth embodiment of the zoom lens photographing at the wide-angle end and in infinity focus.

In conjunction with the following description of embodiments of the present invention, various optical data of parameters are used; that is, surface number NS denotes the n-th surfaces of individual lens pieces in a series counted on the closest to an object first basis, R denotes a radius of curvature (in millimeters) of each of the surfaces of the lens pieces, D is a distance (in millimeters) along the optical axis between any of the adjacent pairs of the surfaces of the lens pieces, Nd denotes a refractive index for the d-line (wavelength $\lambda$=587.6 nm), and $\nu$d is an Abbe number for the d-line (wavelength $\lambda$=587.6 nm). In addition, the surface number succeeded by STOP designates an aperture stop. The surface number succeeded by ASPH indicates an aspherical surface of which radius of curvature R in the optical parameter table is a paraxial curvature radius (in millimeters).

Embodiment 1

A first embodiment of the zoom lens comprises a first positive lens group G1 of plus refractive power, a first negative lens group G2 of minus refractive power, another or second positive lens group G3 of plus refractive power, another or second negative lens group G4 of minus refractive power, and additional lens group A G5 of minus refractive power and lens group B G6 of plus refractive power arranged serially in order on the closest to an object first basis.

The first positive lens group G1 is comprised of a cemented lens of two lens pieces, namely, a negative power meniscus lens piece L1 positioned the closest to the object and having its convex surface faced toward the object and a positive power lens piece L2, and a positive power meniscus lens piece L3 positioned the farthest from the object and having its convex surface faced toward the object.

The second negative lens group G2 is comprised of a negative power meniscus lens piece L4 having its front side shaped in aspherical surface and its rear side shaped in intensely in-curved concave surface, a lens piece L5 having its opposite sides shaped in concave surface, a lens piece L6 having its opposite sides shaped in convex surface, and a negative power meniscus lens piece L7 having its concave surface faced toward the object arranged serially in order on the closest to an object first basis.

The second positive lens group G3 is comprised of a lens piece L8 positioned the closest to the object and having its opposite sides shaped in aspherical surface, a lens piece L9 having its opposite sides shaped in concave surface, and a lens piece L10 positioned the farthest from the object and having its opposite sides shaped in convex surface.

The second negative lens group G4 is comprised of a cemented lens of two lens pieces, namely, a lens piece L11 positioned closer to the object and having its opposite sides shaped in convex surface and its aspherical surface faced toward the image plane and a lens piece L12 having its opposite sides shaped in concave surface.

The lens group A G5 includes a negative power meniscus lens piece L13 having its concave surface faced toward the image plane.

The Lens group B G6 includes a positive power meniscus lens piece L14 having its convex surface faced toward the image plane.

The first embodiment of the zoom lens thus configured, upon shifting the focus from wide-angle end to telephoto for zooming out, has it first positive lens group G1 displaced toward the object, its first negative lens group G2 traversed along the trajectory first coming closer to and then apart from the image plane, its second positive lens group G3 displaced toward the object, its second negative lens group G4 traversed relative to the second positive lens group G3 along the trajectory first coming closer to and then apart from the image plane, its lens group A G5 displaced toward the object, and its lens group B G6 kept stationary relative to the image plane.

Focusing on an object within close-up photographing range is conducted by displacing the second negative lens group G4 toward the image plane.

The optical data of parameters on the zoom lens in the first embodiment are given as follows:

TABLE 1

| NS | R | D | Nd | vd |
|---|---|---|---|---|
| 1 | 63.6829 | 1.3000 | 1.91048 | 31.31 |
| 2 | 36.5043 | 0.0100 | 1.57046 | 42.84 |
| 3 | 36.5043 | 5.9600 | 1.49845 | 81.61 |
| 4 | −852.9715 | 0.2000 | | |
| 5 | 34.2606 | 4.0000 | 1.62032 | 63.39 |
| 6 | 151.8569 | D (6) | | |
| 7 ASPH | 54.3406 | 0.2000 | 1.51700 | 49.96 |
| 8 | 54.6285 | 0.8000 | 1.91695 | 35.25 |
| 9 | 8.9090 | 4.0317 | | |
| 10 | −30.8661 | 0.6500 | 1.91695 | 35.25 |
| 11 | 23.5188 | 0.4000 | | |
| 12 | 17.7113 | 2.9807 | 1.93323 | 20.88 |
| 13 | −28.4855 | 0.7683 | | |
| 14 | −16.2247 | 0.6000 | 1.77621 | 49.62 |
| 15 | −51.4542 | D (15) | | |
| 16 STOP | 0.0000 | 1.2000 | | |
| 17 ASPH | 9.1792 | 2.8596 | 1.58547 | 59.46 |
| 18 ASPH | −21.2748 | 0.3952 | | |
| 19 | −469.2779 | 0.5000 | 1.89461 | 30.74 |
| 20 | 11.3473 | 1.6070 | | |

TABLE 1-continued

| NS | R | D | Nd | vd |
|---|---|---|---|---|
| 21 | 27.4927 | 3.2402 | 1.59489 | 68.62 |
| 22 | −9.5668 | D (22) | | |
| 23 | 48.0920 | 1.2000 | 1.81263 | 25.46 |
| 24 | −93.4000 | 0.0100 | 1.57046 | 42.84 |
| 25 | −93.4000 | 0.6000 | 1.80558 | 45.45 |
| 26 ASPH | 13.0486 | D (26) | | |
| 27 | −12.9322 | 0.6300 | 1.81263 | 25.46 |
| 28 | −18.8160 | D (28) | | |
| 29 | −147.0832 | 1.9501 | 1.73234 | 54.67 |
| 30 | −35.3238 | 9.8000 | | |
| 31 | 0.0000 | 2.8000 | 1.51872 | 64.20 |
| 32 | 0.0000 | 1.0000 | | |

In the above table of the optical data of parameters, any of aspherical surfaces identified by their respective surface numbers succeeded by ASPH can be expressed by the following equation:

$$X(y)=(y^2/R)/[1+(1-\epsilon \cdot y^2/R^2)^{1/2}]+A4 \cdot y^4+A6 \cdot y^6+A8 \cdot y^8+A10 \cdot y^{10}$$

where $X(y)$ is a distance (or a sagittal) from the apex of the aspherical surface to the center of the base of the asphere along the optical axis relative to the height y perpendicular to the optical axis, R is a radius of curvature (or a paraxial curvature radius) of the reference spherical surface, $\epsilon$ is a constant of the cone, and A4, A6, A8 and A10 are constants of the aspherical surfaces.

The optical data of parameters on the aspherical surfaces are given as follows:

TABLE 2

| ASPH | $\epsilon$ | A4 | A6 | A8 | A10 |
|---|---|---|---|---|---|
| 7 | 1.0000 | 1.91163e−005 | −4.04139e−007 | 3.49343e−009 | −1.49337e−011 |
| 17 | 1.0000 | −1.14585e−004 | 4.99824e−006 | −1.46840e−007 | −1.08200e−009 |
| 18 | 1.0000 | 4.60442e−004 | 5.38067e−006 | −2.32614e−007 | 0.00000e+000 |
| 26 | 1.0000 | −6.79774e−006 | −5.35988e−008 | 4.43501e−009 | −9.66065e−011 |

Further given below is a varied distance between the specified adjacent pair of the surfaces of the lens pieces during the zooming in its various stages, that is, with the zoom lens staying at the wide-angle end (f=10.30 mm) being altered to the intermediate focal distance (f=30.47 mm) and up to the telephoto end (f=97.97 mm), and vice versa, together with a focal distance f (in millimeters), F number Fno, and an angle of field $\omega$.

TABLE 3

| f | 10.30 | 30.47 | 97.97 |
|---|---|---|---|
| Fno | 3.6490 | 5.0069 | 5.7049 |
| $\omega$ | 40.281 | 11.231 | 4.671 |
| D(6) | 0.9300 | 15.4076 | 32.7201 |
| D(15) | 20.1523 | 7.8284 | 1.9719 |
| D(22) | 1.2330 | 2.6313 | 1.5000 |
| D(26) | 7.2929 | 5.8946 | 7.0259 |
| D(28) | 0.4190 | 11.1985 | 17.2290 |

Still further given below is a varied distance between the surfaces of the lens pieces from a state where the zoom lens in focus on an object within close-up photographing range stays at the wide-angle end (f=10.30 mm) to another state of its being altered to the intermediate focal length (f=30.47 mm)

and up to the telephoto end (f=97.97 mm), together with a focal length f (in millimeters) of the zoom lens in infinity focus and a distance D(0) (in millimeters) from the object to photograph to the foremost or first lens surface:

| f | 10.30 | 30.47 | 97.97 |
|---|---|---|---|
| D(0) | 920.28 | 903.19 | 889.86 |
| D(22) | 1.2704 | 3.3008 | 2.9038 |
| D(26) | 7.2555 | 5.2251 | 5.6221 |

Embodiment 2

A second embodiment of the zoom lens comprises a first positive lens group G1 of plus refractive power, a first negative lens group G2 of minus refractive power, another or second positive lens group G3 of plus refractive power, another or second negative lens group G4 of minus refractive power, and additional lens group A G5 of minus refractive power and lens group B G6 of plus refractive power serially arranged in order on the closest to an object first basis.

The first positive lens group G1 is comprised of a cemented lens of two lens pieces, namely, a negative power meniscus lens piece L1 the closest to the object and having its convex surface faced toward the object and a positive power lens piece L2, and a positive power meniscus lens piece L3 having its convex surface faced toward the object.

The first negative lens group G2 is comprised of a negative power meniscus lens piece L4 the closest to the object and having its aspherical surface faced toward the object and its rear side shaped in intensely in-curved concave surface, a lens piece L5 the second closest to the object and having its opposite sides shaped in concave surface, a lens piece L6 having its opposite sides shaped in convex surface, and a negative power meniscus lens piece L7 the farthest from the object and having its concave surface faced toward the object.

The second positive lens group G3 is comprised of a lens piece L8 the closest to the object and having its opposite sides shaped in aspherical convex surface, a negative power lens piece L9 having its concave surface faced toward the image plane, a cemented lens of two lens pieces, namely, a lens piece L10 having its aspherical surface faced toward the object and its opposite sides shaped in convex surface and a negative power meniscus lens piece L11 having its concave surface faced toward the object, and another cemented lens of two lens pieces, namely, a negative power meniscus lens piece L12 having its concave surface faced toward the image plane and a lens piece L13 having its opposite sides shaped in convex surface.

The second negative lens group G4 is comprised of a cemented lens of two lens pieces, namely, a lens piece L14 closer to the object and having its opposite sides shaped in convex surface and a lens piece L15 having its opposite sides shaped in concave surface.

The lens group A G5 includes a negative power meniscus lens piece L16 having its concave surface faced toward the image plane.

The lens group B G6 includes a positive power meniscus lens piece L17 having its convex surface faced toward the image plane.

The second embodiment of the zoom lens thus configured, upon shifting the focus from wide-angle end to telephoto to vary magnification, has its first positive lens group G1 displaced toward the object, its first negative lens group G2 traversed along the trajectory first coming closer to and then apart from the image plane, its second positive lens group G3 displaced toward the object, its second negative lens group G4 traversed relative to the second positive lens group G3 along the trajectory first coming closer to and then apart from the image plane, its lens group A G5 displaced toward the object, and its lens group B G6 kept stationary relative to the image plane.

Focusing on an object within close-up photographing range is conducted by displacing the second negative lens group G4 toward the image plane.

The optical data of parameters on the zoom lens in the second embodiment are given as follows:

TABLE 4

| NS | R | D | Nd | vd |
|---|---|---|---|---|
| 1 | 71.8184 | 1.3000 | 1.91048 | 31.31 |
| 2 | 38.1169 | 0.0100 | 1.57046 | 42.84 |
| 3 | 38.1169 | 4.5000 | 1.49845 | 81.61 |
| 4 | −271.5053 | 0.2000 | | |
| 5 | 34.2543 | 3.5128 | 1.62032 | 63.39 |
| 6 | 144.7606 | D(6) | | |
| 7 ASPH | 51.0704 | 0.2000 | 1.51700 | 49.96 |
| 8 | 43.5620 | 0.7600 | 1.91695 | 35.25 |
| 9 | 9.1890 | 3.7360 | | |
| 10 | −21.5757 | 0.6040 | 1.91695 | 35.25 |
| 11 | 29.1538 | 0.4000 | | |
| 12 | 20.4299 | 2.7524 | 1.93323 | 20.88 |
| 13 | −21.6790 | 0.7155 | | |
| 14 | −12.4871 | 0.5960 | 1.77621 | 49.62 |
| 15 | −39.8843 | D(15) | | |
| 16 STOP | 0.0000 | 1.2000 | | |
| 17 ASPH | 10.5362 | 2.8018 | 1.58547 | 59.46 |
| 18 ASPH | −22.5427 | 0.2000 | | |
| 19 | 158.7690 | 0.5000 | 1.83945 | 42.72 |
| 20 | 12.7924 | 1.5947 | | |
| 21 ASPH | 43.3184 | 2.3000 | 1.58547 | 59.46 |
| 22 | −12.8698 | 0.0100 | 1.57046 | 42.84 |
| 23 | −12.8698 | 0.4670 | 1.91048 | 31.31 |
| 24 | −21.0076 | 0.8760 | | |
| 25 | 64.1680 | 0.4670 | 1.91695 | 35.25 |
| 26 | 15.3783 | 0.0100 | 1.57046 | 42.84 |
| 27 | 15.3783 | 3.0765 | 1.62032 | 63.39 |
| 28 | −13.0505 | D(28) | | |
| 29 | 41.5408 | 1.3000 | 1.81263 | 25.46 |
| 30 | −58.6162 | 0.0100 | 1.57046 | 42.84 |
| 31 | −58.6162 | 0.4830 | 1.80831 | 46.50 |
| 32 | 12.0837 | D(32) | | |
| 33 | −15.2307 | 0.6300 | 1.81263 | 25.46 |
| 34 | −23.6034 | D(34) | | |
| 35 | −87.2068 | 1.9569 | 1.73234 | 54.67 |
| 36 | −27.2049 | 9.8000 | | |
| 37 | 0.0000 | 2.8000 | 1.51872 | 64.20 |
| 38 | 0.0000 | 1.0000 | | |

The optical data of parameters of the aspherical surfaces are given as follows:

TABLE 5

| ASPH | ϵ | A4 | A6 | A8 | A10 |
|---|---|---|---|---|---|
| 7 | 1.0000 | 2.99229e−005 | −2.77911e−007 | 4.08113e−009 | −6.45590e−012 |
| 17 | 1.0000 | −9.24021e−005 | −2.03212e−006 | 1.09833e−007 | −3.07901e−009 |
| 18 | 1.0000 | 2.42296e−004 | −3.20842e−006 | 1.17483e−007 | −3.05003e−009 |
| 21 | 1.0000 | −1.20912e−005 | −1.01954e−006 | 2.87946e−008 | −2.68033e−010 |

Further given below is a varied distance between the specified adjacent pairs of the surfaces of the lens pieces during the zooming in its various stages, that is, with the zoom lens staying at the wide-angle end (f=11.22 mm) being altered to the intermediate focal distance (f=63.64 mm) and up to the telephoto end (f=145.52), and vice versa, together with a focal distance f (in millimeters), F number Fno, and an angle of field ω.

TABLE 6

| f | 11.22 | 63.64 | 145.52 |
|---|---|---|---|
| Fno | 3.6414 | 5.3644 | 5.7509 |
| ω | 37.997 | 9.208 | 3.170 |
| D(6) | 0.9300 | 21.8749 | 36.7527 |
| D(15) | 18.6221 | 4.8769 | 1.4250 |
| D(28) | 1.1900 | 4.2490 | 1.0100 |
| D(32) | 8.8421 | 5.7832 | 9.0221 |
| D(34) | 0.8860 | 15.9875 | 20.1532 |

Still further given below is a varied distance between the surfaces of the lens pieces from a state where the zoom lens in focus on an object within close-up photographing range stays at the wide-angle end (f=11.22 mm) to another state of its being altered to the intermediate focal length (f=63.64 mm) and up to the telephoto end (f=145.52 mm), together with a focal length f (in millimeters) of the zoom lens in infinity focus and a distance D(0) (in millimeters) from the object to photograph to the foremost or first lens surface:

| f | 11.22 | 63.64 | 145.52 |
|---|---|---|---|
| D(0) | 918.76 | 896.55 | 880.86 |
| D(28) | 1.2267 | 4.6723 | 3.4247 |
| D(32) | 8.8054 | 5.3598 | 6.6074 |

Embodiment 3

A third embodiment of the zoom lens comprises a first positive lens group G1 of plus refractive power, a first negative lens group G2 of minus refractive power, another or second positive lens group G3 of plus refractive power, another or second negative lens group G4 of minus refractive power, additional lens group A G5 of minus refractive power and lens group B G6 of plus refractive power serially arranged in order on the closest to an object first basis.

The first positive lens group G1 is comprised of a cemented lens of two lens pieces, namely, a negative power meniscus lens piece L1 the closest to the object and having its convex surface faced toward the object and a positive power lens piece L2, and a positive power meniscus lens piece L3 having its convex surface faced toward the object.

The first negative lens group G2 is comprised of a negative power meniscus lens piece L4 the closest to the object and having its front side shaped in aspherical surface and its rear side shaped in intensely in-curved concave surface, a lens piece L5 the second closest to the object and having its opposite sides shaped in concave surface, a lens piece L6 having its opposite sides shaped in convex surface, and a negative power meniscus lens piece L7 the farthest from the object and having its concave surface faced toward the object.

The second positive lens group G3 is comprised of a lens piece L8 the closest to the object and having its opposite sides shaped in aspherical convex surface, a negative power lens piece L9 having its concave surface faced toward the image plane, a cemented lens of two lens pieces, namely, a lens piece L10 having its aspherical surface faced toward the object and its opposite sides shaped in convex surface and a negative power meniscus lens piece L11 having its concave surface faced toward the object, and another cemented lens of two lens pieces, namely, a negative power meniscus lens piece L12 having its concave surface faced toward the image plane and a lens piece L13 having its opposite sides shaped in convex surface.

The second negative lens group G4 is comprised of a cemented lens of two lens pieces, namely, a lens piece L14 closer to the object and having its opposite sides shaped in convex surface and a lens piece L15 having its opposite sides shaped in concave surface.

The lens group A G5 is comprised of a negative power meniscus lens piece L16 having its concave surface faced toward the image plane.

The lens group B G6 is comprised of a positive power meniscus lens piece L17 having its convex surface faced toward the image plane.

The third embodiment of the zoom lens thus configured, upon shifting the focus from wide-angle end to telephoto to vary magnification, has its first positive lens group G1 displaced toward the object, its first negative lens group G2 traversed along the trajectory first coming closer to and then apart from the image plane, its second positive lens group G3 displaced toward the object, its second negative lens group G4 traversed relative to the second positive lens group G3 along the trajectory first coming closer to and then apart from the image plane, its lens group A G5 displaced toward the object, and its lens group B G6 kept stationary relative to the image plane.

Focusing on an object within close-up photographing range is conducted by displacing the second negative lens group G4 toward the image plane.

The optical data of parameters of the zoom lens in the third embodiment are given as follows:

TABLE 7

| NS | R | D | Nd | vd |
|---|---|---|---|---|
| 1 | 109.0553 | 1.5000 | 1.90366 | 31.31 |
| 2 | 52.5697 | 0.0100 | 1.56732 | 42.84 |
| 3 | 52.5697 | 5.5700 | 1.49700 | 81.61 |
| 4 | −146.2327 | 0.2000 | | |
| 5 | 39.5728 | 3.9700 | 1.61800 | 63.39 |
| 6 | 112.3407 | D(6) | | |
| 7 ASPH | 79.0234 | 0.2000 | 1.51460 | 49.96 |
| 8 | 65.0676 | 0.9000 | 1.91082 | 35.25 |
| 9 | 12.3717 | 4.1854 | | |
| 10 | −23.8730 | 0.7500 | 1.91082 | 35.25 |
| 11 | 42.3962 | 0.4930 | | |
| 12 | 28.5426 | 3.3730 | 1.92286 | 20.88 |
| 13 | −24.6589 | 1.0150 | | |
| 14 | −14.8587 | 0.7500 | 1.77250 | 49.62 |
| 15 | −49.5781 | D(15) | | |
| 16 STOP | 0.0000 | 1.5000 | | |
| 17 ASPH | 13.2954 | 3.2480 | 1.58313 | 59.46 |
| 18 ASPH | −32.0948 | 0.2000 | | |
| 19 | 62.5251 | 0.6200 | 1.86188 | 42.08 |
| 20 | 15.8491 | 2.0200 | | |
| 21 ASPH | 61.7390 | 2.8500 | 1.58313 | 59.46 |
| 22 | −15.2253 | 0.0100 | 1.56732 | 42.84 |
| 23 | −15.2253 | 0.6000 | 1.90766 | 33.41 |
| 24 | −25.8791 | 1.0200 | | |
| 25 | 109.2068 | 0.5800 | 1.91082 | 35.25 |
| 26 | 20.0859 | 0.0100 | 1.56732 | 42.84 |
| 27 | 20.0859 | 3.7247 | 1.61882 | 64.32 |
| 28 | −16.2282 | D(28) | | |
| 29 | 51.3428 | 1.6830 | 1.80518 | 25.46 |
| 30 | −75.7267 | 0.0100 | 1.56732 | 42.84 |
| 31 | −75.7267 | 0.6000 | 1.80420 | 46.50 |
| 32 | 15.6073 | D(32) | | |
| 33 | −18.5559 | 0.9000 | 1.80518 | 25.46 |

TABLE 7-continued

| NS | R | D | Nd | vd |
|---|---|---|---|---|
| 34 | −28.5021 | D(34) | | |
| 35 | −152.2485 | 2.3543 | 1.72916 | 54.67 |
| 36 | −38.5471 | 11.0000 | | |
| 37 | 0.0000 | 4.2000 | 1.51680 | 64.20 |
| 38 | 0.0000 | 1.0000 | | |

The optical data of parameters on the aspherical surfaces are given as follows:

TABLE 8

| ASPH | ε | A4 | A6 | A8 | A10 |
|---|---|---|---|---|---|
| 7 | 1.0000 | 1.19556e−005 | −5.12224e−008 | 4.21707e−010 | 2.89639e−012 |
| 17 | 1.0000 | −4.81203e−005 | −6.04617e−007 | 2.40398e−008 | −4.15344e−010 |
| 18 | 1.0000 | 1.17843e−004 | −9.32847e−007 | 2.61092e−008 | −4.24829e−010 |
| 21 | 1.0000 | −5.75515e−006 | −1.80638e−007 | 2.44731e−009 | −5.43340e−012 |

Further given below is a varied distance between the specified adjacent pairs of the surfaces of the lens pieces during the zooming in its various stages, that is, with the zoom lens staying at the wide-angle end (f=14.43 mm) being altered to the intermediate focal distance (f=57.85 mm) and up to the telephoto end (f=145.40 mm), and vice versa, together with a focal distance f (in millimeters), F number Fno, and an angle of field ω.

TABLE 9

| f | 14.43 | 57.85 | 145.40 |
|---|---|---|---|
| Fno | 3.6708 | 5.4085 | 5.9148 |
| ω | 37.102 | 10.651 | 3.671 |
| D(6) | 1.1330 | 24.2823 | 41.7003 |
| D(15) | 21.7353 | 5.4909 | 1.7000 |
| D(28) | 1.4374 | 6.0872 | 3.6419 |
| D(32) | 12.1029 | 7.4531 | 9.8984 |
| D(34) | 1.0300 | 19.1189 | 24.8250 |

Still further given below is a varied distance between the surfaces of the lens pieces from a state where the zoom lens in focus on an object within close-up photographing range stays at the wide-angle end (f=14.43 mm) to another state of its being altered to the intermediate focal length (f=57.85 mm) and up to the telephoto end (f=145.40 mm), together with a focal length f (in millimeters) of the zoom lens in infinity focus and a distance D(0) (in millimeters) from the object to photograph to the foremost or first lens surface:

| f | 14.43 | 57.85 | 145.40 |
|---|---|---|---|
| D(0) | 901.52 | 876.67 | 857.15 |
| D(28) | 1.5087 | 6.7510 | 6.5503 |
| D(32) | 12.0316 | 6.7893 | 6.9900 |

Embodiment 4

A fourth embodiment of the zoom lens comprises a first positive lens group G1 of plus refractive power, a first negative lens group G2 of minus refractive power, another or second positive lens group G3 of plus refractive power, another or second negative lens group G4 of minus refractive power, and an additional lens group A G5 of minus refractive power serially arranged in order on the closest to an object first basis.

The first positive lens group G1 is comprised of a cemented lens of two lens pieces, namely, a negative power meniscus lens piece L1 the closest to the object and having its convex surface faced toward the object and a positive power lens piece L2, and a positive power meniscus lens piece L3 having its convex surface faced toward the object.

The first negative lens group G2 is comprised of a negative power meniscus lens piece L4 the closest to the object and having its front side shaped in aspherical and its rear side shaped in intensely in-curved concave surface, a lens piece L5 the second closest to the object and having its opposite sides shaped in concave surface, a lens piece L6 having its opposite sides shaped in convex surface, and a negative power meniscus lens piece L7 the farthest from the object and having its concave surface faced toward the object.

The second positive lens group G3 is comprised of a lens piece L8 the closest to the object and having its opposite sides shaped in aspherical convex surface, a meniscus lens piece L9 of minus refractive power, and a lens piece L10 having its opposite sides shaped in convex surface.

The second negative lens group G4 is comprised of a cemented lens of two lens pieces, namely, a lens piece L11 closer to the object and having its opposite sides shaped in convex surface and a lens piece L12 having an aspherical surface faced toward the image plane and its opposite sides shaped in concave surface.

The lens group A G5 is comprised of a negative power meniscus lens piece L13 having its concave surface faced toward the image plane, and a lens piece L14 having its opposite sides shaped in convex surface.

The third embodiment of the zoom lens thus configured, upon shifting the focus from wide-angle end to telephoto to vary magnification, has its first positive lens group G1 displaced toward the object, its first negative lens group G2 traversed along the trajectory first coming closer to and then apart from the image plane, its second positive lens group G3 displaced toward the object, its second negative lens group G4 traversed relative to the second positive lens group G3 along the trajectory first coming closer to and then apart from the image plane, and its lens group A G5 displaced toward the object.

Focusing on an object within close-up photographing range is conducted by displacing the second negative lens group G4 toward the image plane.

The optical data of parameters of the zoom lens in the fourth embodiment are given as follows:

TABLE 10

| NS | R | D | Nd | vd |
|---|---|---|---|---|
| 1 | 65.0172 | 1.3000 | 1.91048 | 31.31 |
| 2 | 36.2100 | 0.0100 | 1.57046 | 42.84 |
| 3 | 36.2100 | 6.0000 | 1.49845 | 81.61 |
| 4 | −2179.5150 | 0.2000 | | |
| 5 | 35.2814 | 4.0027 | 1.62032 | 63.39 |
| 6 | 183.6531 | D(6) | | |
| 7 ASPH | 42.2125 | 0.2000 | 1.51700 | 49.96 |
| 8 | 42.6979 | 0.8000 | 1.91695 | 35.25 |
| 9 | 8.4806 | 4.0102 | | |
| 10 | −40.2053 | 0.6500 | 1.91695 | 35.25 |

TABLE 10-continued

| NS | R | D | Nd | vd |
|---|---|---|---|---|
| 11 | 19.8739 | 0.4000 | | |
| 12 | 15.7705 | 2.9108 | 1.93323 | 20.88 |
| 13 | −39.4484 | 0.7583 | | |
| 14 | −17.4656 | 0.6000 | 1.77621 | 49.62 |
| 15 | −52.0671 | D(15) | | |
| 16 STOP | 0.0000 | 1.2000 | | |
| 17 ASPH | 8.5883 | 3.0750 | 1.58547 | 59.46 |
| 18 ASPH | −25.0697 | 0.4400 | | |
| 19 | 171.5901 | 0.5000 | 1.91048 | 31.31 |
| 20 | 10.4093 | 1.6207 | | |
| 21 | 25.6522 | 3.1313 | 1.59489 | 68.62 |
| 22 | −9.9776 | D(22) | | |
| 23 | 46.2354 | 1.2000 | 1.81263 | 25.46 |
| 24 | −53.2640 | 0.0100 | 1.57046 | 42.84 |
| 25 | −53.2640 | 0.6000 | 1.80558 | 45.45 |
| 26 ASPH | 13.2084 | D(26) | | |
| 27 | −11.9913 | 0.6300 | 1.81263 | 25.46 |
| 28 | −21.7212 | 0.2000 | | |
| 29 | 57.2469 | 2.1490 | 1.48914 | 70.44 |
| 30 | −29.7248 | D(30) | | |
| 31 | 0.0000 | 2.8000 | 1.51872 | 64.20 |
| 32 | 0.0000 | 1.0000 | | |

The optical data of parameters on the aspherical surfaces are given as follows:

TABLE 11

| ASPH | ε | A4 | A6 | A8 | A10 |
|---|---|---|---|---|---|
| 7 | 1.0000 | 8.18698e−006 | −2.73054e−007 | 1.74363e−009 | −8.23298e−012 |
| 17 | 1.0000 | −1.01823e−004 | 2.84220e−006 | −6.99155e−008 | −7.96183e−010 |
| 18 | 1.0000 | 4.60590e−004 | 3.18830e−006 | −1.41926e−007 | 0.00000e+000 |
| 26 | 1.0000 | −1.47382e−005 | −1.68264e−006 | 1.30906e−007 | −2.85225e−009 |

Further given below is a varied distance between the specified adjacent pairs of the surfaces of the lens pieces during the zooming in its various stages, that is, with the zoom lens staying at the wide-angle end (f=10.30 mm) being altered to the intermediate focal distance (f=38.91 mm) and up to the telephoto end (f=100.21 mm), and vice versa, together with a focal distance f (in millimeters), F number Fno, and an angle of field ω.

TABLE 12

| f | 10.30 | 38.91 | 100.21 |
|---|---|---|---|
| Fno | 3.6579 | 5.0177 | 5.8760 |
| ω | 40.250 | 11.571 | 4.601 |
| D(6) | 0.9300 | 21.0041 | 33.8012 |
| D(15) | 19.9939 | 5.7856 | 1.5907 |
| D(22) | 1.3754 | 2.5090 | 0.5000 |
| D(26) | 6.4996 | 5.3660 | 7.3750 |
| D(30) | 9.8000 | 20.7392 | 28.8212 |

Still further given below is a varied distance between the surfaces of the lens pieces from a state where the zoom lens in focus on an object within close-up photographing range stays at the wide-angle end (f=10.30 mm) to another state of its being altered to the intermediate focal length (f=38.91 mm) and up to the telephoto end (f=100.21 mm), together with a focal length f (in millimeters) of the zoom lens in infinity focus and a distance D(0) (in millimeters) from the object to photograph to the foremost or first lens surface:

| f | 10.30 | 38.91 | 100.21 |
|---|---|---|---|
| D(0) | 921.00 | 904.28 | 887.50 |

-continued

| D(22) | 1.4164 | 2.8590 | 1.9547 |
| D(26) | 6.4586 | 5.0160 | 5.9203 |

For each of the embodiments described so far, the values to substitute for the terms in the formulae are given as follows:

TABLE 13

| | Embodiment 1 | Embodiment 2 | Embodiment 3 | Embodiment 4 |
|---|---|---|---|---|
| $\beta 2nmax/\beta 2nmin$ | 1.170 | 1.194 | 1.151 | 1.370 |
| $(1 - \beta 2nt^2) \cdot \beta rt^2$ | −6.693 | −8.267 | −7.217 | −6.808 |
| $\beta 3t/\beta 3w$ | 1.234 | 1.259 | 1.262 | 1.056 |
| $\beta 1nt/\beta 1nw$ | 4.540 | 6.759 | 4.488 | 4.314 |
| frt/ft | −0.391 | −0.460 | −0.503 | −0.225 |

DESCRIPTION OF THE ALPHANUMERIC REFERENCE SYMBOLS

STOP Aperture Stop
G1 1st Positive Lens Group
G2 1st Negative Lens Group
G3 2nd Positive Lens Group
G4 2nd Negative Lens Group
G5 Lens Group A
G6 Lens Group B

The invention claimed is:

1. A zoom lens of which lens optics comprises at least a first negative lens group of minus refractive power, a second negative lens group of minus refractive power positioned closer to the image plane, and another lens group A positioned immediately behind the second negative lens group and closer to the image plane, the second negative lens group alone being displaced toward the image plane for shifting the focus from an infinity point to an object within close-up photographing range, the zoom lens meeting the requirements defined in the formula as follows:

$$1.0 < \beta 2nmax/\beta 2nmin < 1.4 \tag{1}$$

$$(1-\beta 2nt^2) \times \beta rt^2 < -6.0 \tag{2}$$

where β2nmax is the maximum value of lateral magnification of the second negative lens group during the zooming, β2nmin is the minimum value of lateral magnification of the second negative lens group during the zooming, β2nt is a lateral magnification of the second negative lens group when the zoom lens is focusing telephoto, and βrt is a composite lateral magnification of lens groups positioned closer to the image plane than the second negative lens group when the zoom lens is focusing telephoto.

2. The zoom lens according to claim 1, wherein the lens group A meets the requirements defined in the formula as follows:

$$1.05 < \beta 3t/\beta 3w < 2.00 \tag{3}$$

where β3t is a lateral magnification of the lens group A when the zoom lens is focusing telephoto, and β3w is a lateral magnification of the lens group A when the zoom lens is focusing wide angle.

3. The zoom lens according to claim 1, wherein the first negative lens group meet the requirements defined in the formula as follows:

$$3.5 < \beta 1nt/\beta 1nw < 8 \quad (4)$$

where β1nt is a lateral magnification of the first negative lens group when the zoom lens is focusing telephoto, and β1nw is a lateral magnification of the first negative lens group when the zoom lens is focusing wide angle.

4. The zoom lens according to claim 1, wherein a first positive lens group of plus refractive power is disposed before the first negative lens group and closer to the object to photograph.

5. The zoom lens according to claim 4, wherein there are disposed a series of lens groups arranged in order on the closest to the object first basis, including the first positive lens group, the first negative lens group, another or second positive lens group of plus refractive power, the second negative lens group, and the lens group A.

6. The zoom lens according to claim 1, wherein the lens group A exhibits minus refractive power.

7. The zoom lens according to claim 1, wherein the lens groups behind the second negative lens group and closer to the image plane meet the requirements defined in the formula as follows:

$$-1.0 < frt/ft < -0.15 \quad (5)$$

where frt is a composite focal length of the lens groups behind the second negative lens group and closer to the image plane, and ft is a focal length of the zoom lens focusing telephoto.

8. A camera device comprising the zoom lens according to claim 1 and image pick-up sensors positioned behind the zoom lens and close to the image plane for converting an image optically produced by the zoom lens into electric signals.

9. A zoom lens of which lens optics comprises at least a first negative lens group of minus refractive power, another or second negative lens group of minus refractive power positioned closer to the image plane, and an additional lens group A positioned immediately behind the second negative lens group and closer to the image plane, the second negative lens group alone being displaced toward the image plane for shifting the focus from an infinity point to an object within close-up photographing range, the zoom lens meeting the requirements defined in the formula as follows:

$$1.0 < \beta 2nmax/\beta 2nmin < 1.4 \quad (1)$$

$$1.05 < \beta 3t/\beta 3w < 2.00 \quad (3)$$

where β2nmax is the maximum value of lateral magnification of the second negative lens group during the zooming, β2nmin is the minimum value of lateral magnification of the second negative lens group during the zooming, β3t is a lateral magnification of the lens group A when the zoom lens is focusing telephoto, and β3w is a lateral magnification of the lens group A when the zoom lens is focusing wide angle.

10. The zoom lens according to claim 9, wherein the first negative lens group meet the requirements defined in the formula as follows:

$$3.5 < \beta 1nt/\beta 1nw < 8 \quad (4)$$

where β1nt is a lateral magnification of the first negative lens group when the zoom lens is focusing telephoto, and β1nw is a lateral magnification of the first negative lens group when the zoom lens is focusing wide angle.

11. The zoom lens according to claim 9, wherein a first positive lens group of plus refractive power is disposed before the first negative lens group and closer to the object to photograph.

12. The zoom lens according to claim 11, wherein there are disposed a series of lens groups arranged in order on the closest to the object first basis, including the first positive lens group, the first negative lens group, another or second positive lens group of plus refractive power, the second negative lens group, and the lens group A.

13. The zoom lens according to claim 9, wherein the lens group A exhibits minus refractive power.

14. The zoom lens according to claim 9, wherein the lens groups behind the second negative lens group and closer to the image plane meet the requirements defined in the formula as follows:

$$-1.0 < frt/ft < -0.15 \quad (5)$$

where frt is a composite focal length of the lens groups behind the second negative lens group and closer to the image plane, and ft is a focal length of the zoom lens focusing telephoto.

15. A camera device comprising the zoom lens according to claim 9 and image pick-up sensors positioned behind the zoom lens and close to the image plane for converting an image optically produced by the zoom lens into electric signals.

* * * * *